(12) United States Patent
Morris

(10) Patent No.: US 7,567,553 B2
(45) Date of Patent: Jul. 28, 2009

(54) METHOD, SYSTEM, AND DATA STRUCTURE FOR PROVIDING A GENERAL REQUEST/RESPONSE MESSAGING PROTOCOL USING A PRESENCE PROTOCOL

(75) Inventor: Robert P. Morris, Raleigh, NC (US)

(73) Assignee: Swift Creek Systems, LLC, Portsmouth, NH (US)

( * ) Notice: Subject to any disclaimer, the term of this patent is extended or adjusted under 35 U.S.C. 154(b) by 516 days.

(21) Appl. No.: 11/160,157

(22) Filed: Jun. 10, 2005

(65) Prior Publication Data

US 2006/0280166 A1 Dec. 14, 2006

(51) Int. Cl.
*H04L 12/66* (2006.01)
*H04J 3/22* (2006.01)

(52) U.S. Cl. .................. 370/352; 370/466
(58) Field of Classification Search .............. 455/456.1, 455/456.3, 419, 418, 435.1, 445; 370/238, 370/353, 466, 457, 352
See application file for complete search history.

(56) References Cited

U.S. PATENT DOCUMENTS

| | | | |
|---|---|---|---|
| 5,491,626 A | 2/1996 | Williams et al. |
| 5,893,083 A | 4/1999 | Eshghi et al. |
| 5,963,913 A | 10/1999 | Henneuse et al. |
| 5,976,395 A | 11/1999 | Ha |
| 6,085,166 A | 7/2000 | Beckhardt et al. |
| 6,148,328 A | 11/2000 | Cuomo et al. |
| 6,301,609 B1 | 10/2001 | Aravamudan et al. |
| 6,400,381 B1 | 6/2002 | Barrett et al. |
| 6,430,604 B1 | 8/2002 | Ogle et al. |
| 6,480,885 B1 | 11/2002 | Olivier |
| 6,549,939 B1 | 4/2003 | Ford et al. |
| 6,654,790 B2 | 11/2003 | Ogle et al. |
| 6,668,167 B2 | 12/2003 | McDowell et al. |
| 6,668,173 B2 | 12/2003 | Greene |
| 6,754,904 B1 | 6/2004 | Cooper et al. |
| 6,757,722 B2 | 6/2004 | Lonnfors et al. |
| 6,799,196 B1 | 9/2004 | Smith |
| 6,839,735 B2 | 1/2005 | Wong et al. |
| 6,839,737 B1 | 1/2005 | Friskel |
| 6,853,634 B1 | 2/2005 | Davies et al. |
| 6,961,765 B2 | 11/2005 | Terry |
| 7,111,044 B2 | 9/2006 | Lee |
| 7,139,554 B2 | 11/2006 | Litwin |
| 7,177,928 B2 | 2/2007 | Sasaki et al. |
| 7,184,524 B2 | 2/2007 | Digate et al. |

(Continued)

OTHER PUBLICATIONS

Rosenberg, J., "A Data Model For Presence," [online] Feb. 2005 [retrieved on May 6, 2005]; Retrieved from the Internet:<URL:http//www.softarmor.com/wgdb/docs/draft-ietf-simple-presence-data-model02.txt>, 28 pages.

(Continued)

*Primary Examiner*—Melody Mehrpour

(57) ABSTRACT

A method and system are described for providing a general request/response protocol using a presence protocol. According to an exemplary embodiment, a method is described for using the presence protocol for receiving from a requesting entity a descriptor of a resource associated with a responding entity and a request related to the resource. The descriptor and the request are sent to the responding entity using the presence protocol. Using the presence protocol, a response is received from the responding entity replying to the request. The response is sent to the requesting entity using the presence protocol.

34 Claims, 10 Drawing Sheets

U.S. PATENT DOCUMENTS

| | | |
|---|---|---|
| 7,219,303 B2 | 5/2007 | Fish |
| 7,246,371 B2 | 7/2007 | Diacakis et al. |
| 7,251,482 B2 | 7/2007 | Ackermann-Markes |
| 7,263,545 B2 | 8/2007 | Digate et al. |
| 7,269,162 B1 | 9/2007 | Turner |
| 7,334,021 B1 | 2/2008 | Fletcher |
| 7,412,522 B2 | 8/2008 | Liscano et al. |
| 7,444,379 B2 | 10/2008 | Becker et al. |
| 2002/0023132 A1 | 2/2002 | Tornabene et al. |
| 2002/0026505 A1 | 2/2002 | Terry |
| 2002/0055973 A1 | 5/2002 | Low et al. |
| 2002/0103743 A1 | 8/2002 | Najmi |
| 2002/0116461 A1 | 8/2002 | Diacakis et al. |
| 2002/0120687 A1 | 8/2002 | Diacakis et al. |
| 2002/0120774 A1 | 8/2002 | Diacakis |
| 2002/0130904 A1 | 9/2002 | Becker et al. |
| 2002/0184089 A1 | 12/2002 | Tsou et al. |
| 2003/0009530 A1 | 1/2003 | Philonenko et al. |
| 2003/0018726 A1 | 1/2003 | Low et al. |
| 2003/0043190 A1 | 3/2003 | Bernius et al. |
| 2003/0055898 A1 | 3/2003 | Yeager et al. |
| 2003/0055983 A1 | 3/2003 | Callegari |
| 2003/0065788 A1 | 4/2003 | Salomaki |
| 2003/0097410 A1 | 5/2003 | Atkins et al. |
| 2003/0119540 A1 | 6/2003 | Matthis |
| 2003/0120734 A1 | 6/2003 | Kagan et al. |
| 2003/0135569 A1 | 7/2003 | Khakoo et al. |
| 2003/0154293 A1 | 8/2003 | Zmolek |
| 2003/0182428 A1 | 9/2003 | Li et al. |
| 2003/0200268 A1 | 10/2003 | Morris |
| 2003/0217098 A1 | 11/2003 | Bobde et al. |
| 2003/0217109 A1 | 11/2003 | Ordille et al. |
| 2003/0233537 A1 | 12/2003 | Wohlgemuth et al. |
| 2003/0236086 A1 | 12/2003 | Litwin |
| 2003/0236830 A1 | 12/2003 | Ortiz et al. |
| 2003/0236831 A1 | 12/2003 | Ortiz et al. |
| 2003/0236832 A1 | 12/2003 | McIntyre et al. |
| 2004/0002967 A1 | 1/2004 | Rosenblum et al. |
| 2004/0003090 A1 | 1/2004 | Deeds |
| 2004/0015553 A1 | 1/2004 | Griffin et al. |
| 2004/0015569 A1 | 1/2004 | Lonnfors et al. |
| 2004/0034848 A1* | 2/2004 | Moore et al. ............... 717/117 |
| 2004/0037271 A1 | 2/2004 | Liscano et al. |
| 2004/0059781 A1 | 3/2004 | Yoakum et al. |
| 2004/0064821 A1 | 4/2004 | Rouselle |
| 2004/0109197 A1 | 6/2004 | Gardaz et al. |
| 2004/0116119 A1* | 6/2004 | Lewis et al. ............... 455/435.1 |
| 2004/0117458 A1 | 6/2004 | Tominaga |
| 2004/0122896 A1 | 6/2004 | Gourraud |
| 2004/0125941 A1 | 7/2004 | Yoakum |
| 2004/0129901 A1 | 7/2004 | Yamaguchi et al. |
| 2004/0133640 A1 | 7/2004 | Yeager et al. |
| 2004/0133641 A1 | 7/2004 | McKinnon et al. |
| 2004/0153506 A1 | 8/2004 | Ito et al. |
| 2004/0158608 A1 | 8/2004 | Friedman et al. |
| 2004/0162881 A1 | 8/2004 | Digate et al. |
| 2004/0172455 A1 | 9/2004 | Green et al. |
| 2004/0177116 A1 | 9/2004 | McConn et al. |
| 2004/0177134 A1 | 9/2004 | Lonnfors et al. |
| 2004/0179039 A1 | 9/2004 | Blattner et al. |
| 2004/0183829 A1 | 9/2004 | Koutny et al. |
| 2004/0187133 A1 | 9/2004 | Weisshaar et al. |
| 2004/0201668 A1 | 10/2004 | Matsubara et al. |
| 2004/0205134 A1 | 10/2004 | Digate et al. |
| 2004/0215723 A1 | 10/2004 | Chadha |
| 2004/0243941 A1 | 12/2004 | Fish |
| 2004/0267887 A1 | 12/2004 | Berger et al. |
| 2005/0004984 A1 | 1/2005 | Simpson |
| 2005/0004985 A1 | 1/2005 | Stochosky |
| 2005/0004995 A1 | 1/2005 | Stochosky |
| 2005/0010637 A1 | 1/2005 | Dempski et al. |
| 2005/0021624 A1 | 1/2005 | Herf et al. |
| 2005/0021626 A1 | 1/2005 | Prajapat et al. |
| 2005/0027805 A1 | 2/2005 | Aoki |
| 2005/0030939 A1 | 2/2005 | Roy et al. |
| 2005/0039134 A1 | 2/2005 | Wiggeshoff et al. |
| 2005/0044144 A1 | 2/2005 | Malik et al. |
| 2005/0048961 A1* | 3/2005 | Ribaudo et al. ............... 455/419 |
| 2005/0071426 A1 | 3/2005 | Shah |
| 2005/0071428 A1 | 3/2005 | Khakoo et al. |
| 2005/0071433 A1 | 3/2005 | Shah |
| 2005/0080848 A1 | 4/2005 | Shah |
| 2005/0086300 A1 | 4/2005 | Yeager et al. |
| 2005/0086309 A1 | 4/2005 | Galli et al. |
| 2005/0096928 A1 | 5/2005 | Ruggaber et al. |
| 2005/0108387 A1 | 5/2005 | Li et al. |
| 2005/0119012 A1* | 6/2005 | Merheb et al. ............... 455/456.3 |
| 2005/0119913 A1 | 6/2005 | Hornreich et al. |
| 2005/0135240 A1 | 6/2005 | Ozugur |
| 2005/0190744 A1 | 9/2005 | Sun et al. |
| 2005/0197995 A1 | 9/2005 | Badt, Jr. et al. |
| 2005/0213609 A1 | 9/2005 | Brusilovsky et al. |
| 2006/0004911 A1 | 1/2006 | Becker et al. |
| 2006/0004921 A1 | 1/2006 | Suess et al. |
| 2006/0014546 A1* | 1/2006 | Bodin et al. ............... 455/456.1 |
| 2006/0030264 A1 | 2/2006 | Morris |
| 2006/0036712 A1 | 2/2006 | Morris |
| 2006/0190117 A1 | 8/2006 | Weczorek et al. |
| 2006/0224688 A1 | 10/2006 | Morris |
| 2006/0248185 A1 | 11/2006 | Morris |
| 2007/0162360 A1* | 7/2007 | Congram et al. ............... 705/28 |
| 2007/0288580 A1 | 12/2007 | Kaminsky et al. |
| 2008/0046510 A1 | 2/2008 | Beauchamp et al. |
| 2008/0046556 A1 | 2/2008 | Nicholls et al. |
| 2008/0049734 A1* | 2/2008 | Zhakov et al. ............... 370/352 |

OTHER PUBLICATIONS

Day, M., "'HTTP Envy' and Presence Information Protocols," [online] Sep. 1998 [retrieved on May 10, 2005]; Retrieved from the Internet<URL:http//www.watersprings.org/pub/id/draft-day-envy-00.txt>, 4 pages.

Smith, D., et al., "JEP-0124: HTTP Binding," [online] Mar. 2005 [retrieved on May 10, 2005]; Retrieved from the Internet:<URL:http//www.jabber.org/jeps/jep-0124.html>, 22 pages.

Fielding, R., et al., RFC 2616, "Hypertext Transfer Protocol—HTTP/1.1," [online] The Internet Society, Jun. 1999 [retrieved on May 6, 2005]; Retrieved from the Internet: <URL:ftp//ftp.isi.edu/in-notes/rfc2616.txt>, 145 pages.

Nielsen, H., et al., RFC 2774, "An HTTP Extension Framework" [online] The Internet Society, Feb. 2000 [retrieved on May 6, 2005]; Retrieved from the Internet: <URL:ftp//ftp.isi.edu/in-notes/rfc2774.txt>, 17 pages.

Day, M., et al., RFC 2778, "A Model for Presence and Instant Messaging" [online] The Internet Society, Feb. 2000 [retrieved on May 6, 2005]; Retrieved from the Internet: <URL:http://www.ietf.org/rfc/rfc2778.txt?number=2778>, 14 pages.

Day, M., et al., RFC 2779, "Instant Messaging / Presence Protocol Requirements" [online] The Internet Society, Feb. 2000 [retrieved on May 6, 2005]; Retrieved from the Internet: <URL:http://www.ietf.org/rfc/rfc2779.txt>, 22 pages.

Peterson, J., RFC 3859, "Common Profile for Presence (CPP)" [online] The Internet Society, Aug. 2004 [retrieved on May 6, 2005] Retrieved from the Internet: <URL:http://www.ietf.org/rfc/rfc3859.txt>, 13 pages.

Peterson, J., RFC 3860, "Common Profile for Instant Messaging (CPIM)" [online] The Internet Society, Aug. 2004 [retrieved on May 7, 2005] Retrieved from the Internet: <URL:http://www.ietf.org/rfc/rfc3860.txt>, 9 pages.

Sugano, H., et al., RFC 3863, "Presence Information Data Format" [online] The Internet Society, Aug. 2004 [retrieved on May 6, 2005]; Retrieved from the Internet: <URL:http://.ietf.org/rfc/rfc3863.txt>, 24 pages.

P. Saint-Andre, E., RFC 3920, "Extensible Messaging and Presence Protocol (XMPP):Core" [online] The Internet Society, Oct. 2004 [retrieved on May 6, 2005]; Retrieved from the Internet: <URL:http://.ietf.org/rfc/rfc3920.txt>, 75 pages.

P. Saint-Andre, E., RFC 3921, "Extensible Messaging and Presence Protocol (XMPP):Instant Messaging and Presence" [online] The Internet Society, Oct. 2004 [retrieved on Jun. 6, 2005]; Retrieved from the Internet: <URL:http://.ietf.org/rfc/rfc3921.txt>, 89 pages.

Osborne, R., et al., "RVP: A Presence and Instant Messaging Progocol" [online] Microsoft, Aug. 2000 [retrieved on May 10, 2005]; Retrieved from the Internet: <URL:http://msdn.microsoft.com/library/default.asp?url=/library/en-us/dnmes2k/html/rvp.asp>, 19 pages.

Ramsdell, J.D., "Simple Instant Messaging and Presence Protocol Version 2.5" [online] The MITRE Corporation, Sep. 28, 2004 [retrieved on May 10, 2005]; Retrieved from the Internet: <URL:http://simp.mitre.org/download/simp.html>, 22 pages.

Neilsen, H. F. (Microsoft) and Ruellan, H. (Canon), Ed., "SOAP 1.2 Attachment Feature;" [online] W3C, MIT, ERCIM, Keio, Jun. 8, 2004 [retrieved on Aug. 4, 2005]; Retrieved from the Internet: <URL:http://www.w3.org/TR/2003/REC-soap12-part0-20030624/>, 13 pages.

Mitra, N. (Ericsson), Ed., "SOAP Version 1.2 Part 0: Primer," [online] W3C, MIT, ERCIM, Keio, Jun. 24, 2003 [retrieved on Aug. 4, 2005]; Retrieved from the Internet: <URL:http://www.w3.org/TR/2004/NOTE-soap12-af-20040608/>, 47 pages.

Saint-Andre, P., "JEP-0119: Extended Presence Protocol Suite," [online] Jabber Software Foundation Mar. 28, 2005 [retrieved on Aug. 4, 2005]; Retrieved from the Internet: <URL:http//www.jabber.org/jeps/jep-0124.html>, 8 pages.

Sugano, H., et al., "Presence Information Data Format (PIDF)," [online] The Internet Society, May 2003 [retrieved on Aug. 4, 2005]; Retrieved from the Internet: <URL:http://www.ietf.org/proceedings/04aug/I-D/draft-ietf-impp-cpim-pidf-08.txt>, 23 pages.

Universal Mobile Telecommunications System (UMTS), Presence Service; Stage 1, Release 6, (3GPP TS 22.141 v. 6.3.0), European Telecommunications Standards Institute (ETSI) / 3rd Generation Partnership Project, Jan. 2005, 26 pages.

Presence Service; Security, Release 6, (3GPP TS 33.141 V6.1.0), Association of Radio Industries and Business (ARIB) / 3rd Generation Partnership Project, Sep. 2004, 13 pages.

Boman, K., "Presence Security Architecture" (3GPP SA3 Meeting #25, SA3-020569), Ericsson / 3rd Generation Partnership Project, Nov. 2002, 11 pages.

Liscano, R., "Presence and Awareness Services" (FIW 2003 Jun. 11, 2003), University of Ottawa, School for Information Technology and Engineering, Jun. 11, 2003, 89 pages.

* cited by examiner

METHOD, SYSTEM, AND DATA STRUCTURE FOR PROVIDING A GENERAL REQUEST/RESPONSE MESSAGING PROTOCOL USING A PRESENCE PROTOCOL

RELATED APPLICATIONS

The present application is related to co-pending U.S. patent application Ser. No. 11/118,882 entitled "SYSTEM AND METHOD FOR UTILIZING A PRESENCE SERVICE TO ADVERTISE ACTIVITY AVAILABILITY," filed on Apr. 29, 2005, and assigned to the assignee of the present application. The present application is also related to co-pending U.S. patent application Ser. No. 11/096,764, entitled "SYSTEM AND METHOD FOR UTILIZING A PRESENCE SERVICE TO FACILITATE ACCESS TO A SERVICE OR APPLICATION OVER A NETWORK," filed on Mar. 31, 2005, and assigned to the assignee of the present application. The present application is also related to co-pending U.S. patent application Ser. No. 10/960,365, entitled "SYSTEM AND METHOD FOR UTILIZING CONTACT INFORMATION, PRESENCE INFORMATION AND DEVICE ACTIVITY," and co-pending U.S. patent application Ser. No. 10/960,135, entitled "SYSTEM AND METHOD FOR UTILIZING CONTACT INFORMATION, PRESENCE INFORMATION AND DEVICE ACTIVITY," both filed on Oct. 6, 2004, and both assigned to the assignee of the present application. The present application is also related to co-pending U.S. patent application Ser. No. 10/900,558, entitled "SYSTEM AND METHOD FOR PROVIDING AND UTILIZING PRESENCE INFORMATION," filed on Jul. 28, 2004, and assigned to the assignee of the present application. The present application is also related to co-pending U.S. patent application Ser. No. 10/903,576, entitled "SYSTEM AND METHOD FOR HARMONIZING CHANGES IN USER ACTIVITIES, DEVICE CAPABILITES AND PRESENCE INFORMATION," filed on Jul. 30, 2004, and assigned to the assignee of the present application. Each of the above-cited related applications is incorporated here by reference in its entirety.

BACKGROUND

Determining whether a person or object is present and available for interaction or use has been, and likely will remain, an everyday occurrence in society. As technology has evolved, so too have the ways in which we can determine the presence of persons or objects to interact with. For example, the explosive growth over the past two decades in the use of computers and their internetworking via wide-area networks (WANs), such as the Internet, has led to the development and use of presence services. Presence services can be used to convey a user's presence on a network to other network users based on user's connectivity to the network via a computing and/or communication device. Information describing users' presence on a network can be used by applications and/or other services to provide what are referred to here as "presence aware applications".

One of today's more popular presence aware applications is instant messaging (or IM). Popular IM applications include Yahoo's YAHOO MESSENGER, Microsoft's MSN MESSENGER, and America Online's AOL INSTANT MESSENGER (or AIM). IM applications use presence services to allow users to determine whether other users (referred to by these applications as "friends" or "buddies") are present on (e.g., connected to) a network. Presence services can also be used to determine a user's status (e.g., available, not available, and the like) and a communication address for communicating with a user. The communication address can include both a means of communicating with the user (e.g., via a telephone or email) and a corresponding contact address (e.g., a telephone number or email address).

The architecture, models, and protocols associated with presence services in general are described in "Request for Comments" (or RFC) documents RFC 2778 to Day et al., titled "A Model for Presence and Instant Messaging" (February 2000), and RFC 2779 to Day et al., titled "Instant Messaging/Presence Protocol" (February 2000), each published and owned by the Internet Society. While the various presence aware IM applications described above may use proprietary architectures and protocols to implement their presence service components, each of the applications use presence architectures and protocols that are consistent with the presence model and protocols described in RFC 2778 and RFC 2779 in terms of features and function.

The presence service model described in RFC 2778 describes two distinct users of a presence service, referred to as presence "clients". The first of these clients, called a presentity (combining the terms "presence" and "entity"), provides presence information to be stored and distributed throughout the presence service. Presence information includes the status of a user of the presence service and may include additional information used by the service. This additional information can include, for example, the communication means and contract address of the user as described above. Presence information can be stored or maintained in any form for use by the presence service, but typically is organized into portions referred to as presence tuples. As will be understood by those skilled in the art, a tuple, in its broadest sense, is a data object containing one or more components. Thus, a presence tuple can include an identifier of a user and the user's status, contact address, or other information used by the presence service.

The second type of presence client is referred to as a "watcher". Watchers receive presence information from the presence service. The presence model of RFC 2778 describes types of watchers, referred to as "subscribers" and "fetchers". A subscriber requests notification from the presence service of a change in some presentity's presence information. The presence service establishes a subscription on behalf of the subscriber to a presentity's presence information, such that future changes in the presentity's presence information are "pushed" to the subscriber. In contrast, the fetcher class of watchers requests (or fetches) the current value of some presentity's presence information from the presence service. As such, the presence information can be said to be "pulled" from the presence service to the presentity. A special kind of fetcher, referred to as a "poller", is defined in the model that fetches information on a regular (or polling) basis.

The presence service can also manage, store, and distribute presence information associated with watchers, as well as the watchers' activities in terms of the fetching or subscribing to the presence information of other presence clients using the presence service. This "watcher information" can be distributed to other watchers by the presence service using the same mechanisms that are available for distributing the presence information of presentities. It will be understood that while the model describes the presentity and watcher as separate entities, these entities can be combined functionally as a single presence entity having the characteristics of both a presentity and a watcher. Accordingly, the phrase "presence entity" (in contrast to the term "presentity") or more simply the term "entity" with an appropriate modifier (e.g., responding, requesting, receiving, or sending) will be used throughout this document to describe any one or any combination of all of the presentity, watcher, subscriber, fetcher, or poller entities described above.

Users of the presence service are referred to in the presence model described in RFC 2778 as principals. Typically, a principal is a person or group that exists outside of the presence model, but can also represent software or other resources capable of interacting with the presence service. The model does not define the requirements or functionality of principals, but does state that two distinct principals be distinct, and two identical principals be identical. For purposes of this document, this strict interpretation of principals should not be adopted—that is, two distinct principals need not be distinct, and two identical principals need not be identical. For example, the 3rd Generation Partnership Project (3GPP) has included standards for incorporating presence services into their Universal Mobile Telecommunications System (UMTS) that define the use of "public identities" for users of the UMTS. A particular UMTS user may have several public identities. Consequently, were such a public identity to be construed as a principal, the public identity as a principal could be associated with more than one presence client.

According to the general presence model described in RFC 2778, a principal can interact with the presence system through a presence user agent (PUA) or a watcher user agent (WUA). As in the case of the presentity and watcher clients to which these user agents interact, the presence and watcher user agents can be combined functionally as a single user agent having both the characteristics of the presence and watcher user agents. User agents can be implemented such that their functionality exists within the presence service, external to the presence service, or a combination or both internal and external to the presence service.

Most presence aware applications, such as IM, use presence services only to determine an application user's presence, status, and communication address. For example, IM applications do not use the presence service itself to deliver core application services and information, such as the instant messages themselves, to their users. More specifically, IM applications do not use the base presence protocol messages (or commands) to exchange instant message information, but instead rely on a separate and distinct instant message protocol (see, e.g., RFC 2778 and RFC 2779) to exchange this information.

Likewise, other presence aware applications and extensions to presence services would be expected to use new protocols to support these applications or extended services. For example, to create a presence aware application capable of providing request/response services, developers would be expected to use a specific request/response protocol, separate from the presence protocol, to support the request/response services. Examples of request/response protocols include Hypertext Transfer Protocol (HTTP), used, for example, to exchange information between clients and servers over the Internet, and Simple Mail Transfer Protocol (SMTP) used for exchanging email messages over a network.

Indeed, the standards track publications RFC 3920 to Saint-Andre, titled "Extensible Messaging and Presence Protocol (XMPP): Core" (October 2004), and RFC 3921 to Saint-Andre, titled "Extensible Messaging and Presence Protocol (XMPP): Instant Messaging and Presence" (October 2004), each published and owned by the Internet Society, envision the use of separate protocols for supporting presence and request/response services. These publications describe a protocol for streaming Extensible Markup Language (XML) elements to exchange structured information in close to real time between any two network endpoints. Rather than combining both presence information and request/response information into a common XML stanza to be carried using only a presence protocol, XMPP defines the use of a first XML stanza (a "/presence" stanza) for carrying presence information and a separate, second XML stanza (an "/iq" stanza) for carrying request/response information (see, e.g., RFC 3920; section 9). These separate stanzas would then be carried by respective presence and request/response protocol layers.

Others have described arrangements for sending application information using a presence service, but fall short of providing general request/response services using a presence protocol. For example, U.S. Patent Application No. 200410122896 A1 to Gourraud, titled "TRANSMISSION OF APPLICATION INFORMATION AND COMMANDS USING PRESENCE TECHNOLOGY", describes a presence entity that publishes application information or commands destined to a certain application, in the form of a presence tuple. The watcher subscribes to presence information associated with the certain application, and once authorized, receives the tuple with the application information or command.

In a first embodiment, Gourraud's arrangement sends an application identifier from user equipment to an application server using a presence service. The application server then sends predefined information to the user equipment using the presence service. The arrangement does not allow the user equipment to request specific information or services from the application server—only the predefined information may be received. Indeed, no mechanism is described in Gourraud's first embodiment for sending a request from the user equipment to the application through using the presence service or presence protocol. In a second embodiment, Gourraud's arrangement allows a command to be sent from the user equipment to an application server using a presence service. Only an acknowledgment that the command was executed by the server is sent to the user equipment. Moreover, the acknowledgment is sent using a separate protocol from the presence protocol, i.e., an instant message confirmation is sent using the Session Initiation Protocol (SIP). As such, no response is sent from the application server to the user equipment in Gourraud's second embodiment, nor is any mechanism described in the embodiment for sending such a response using the presence service or presence protocol.

Rather than using multiple protocols to support a presence aware application that is capable of providing request/response services, it would be more efficient and desirable to have an arrangement for providing a general request/response messaging protocol using a presence service and its underlying presence protocol.

SUMMARY

Accordingly, a method and system are disclosed for providing a general request/response protocol using a presence protocol. According to an exemplary embodiment, a method is described for using the presence protocol for receiving from a requesting entity a descriptor of a resource associated with the responding entity and a request related to the resource; sending the descriptor and the request to the responding entity; receiving a response from the responding entity replying to the request message; and sending the response to the requesting entity.

According to another exemplary embodiment, a method is disclosed for providing a general request/response protocol using a presence protocol. The method includes receiving via the presence server a descriptor of a resource and a request related to the resource; processing the request by the resource to form a response replying to the request; and sending a response to the presence server replying to the request message.

According to yet another an exemplary embodiment, a method is disclosed for providing a general request/response protocol using a presence protocol. The method includes sending a descriptor of a resource and a request related to the resource; and receiving via the presence server a response replying to the request message.

According to still another exemplary embodiment, a computer readable medium is disclosed containing a data structure for use with a presence protocol in providing a general request/response protocol. The data structure includes a resource data object including an element for storing a descriptor of a resource associated with a responding entity; a request data object including an element for storing a request from a requesting entity related to the resource; and a response data object including an element for storing a response from the responding entity replying to the request message.

According to another exemplary embodiment, a system is described for providing a general request/response protocol. The system includes a presence server configured to receive, store, and distribute information using a presence protocol. A responding device is configured to exchange information with the presence server using the presence protocol. The responding device includes access to at least one resource; a responding watcher component configured to receive via the presence server a descriptor of a resource and a request related to the resource; and a responding presentity component configured to send a response to the presence server replying to the request message. The system also includes a requesting device configured to exchange information with the presence server using the presence protocol. The requesting device includes a requesting presentity component configured to send the descriptor and the request related to the resource to the presence server; and a requesting watcher component configured to receive via the presence server the response replying to the request message.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

Figure 1:
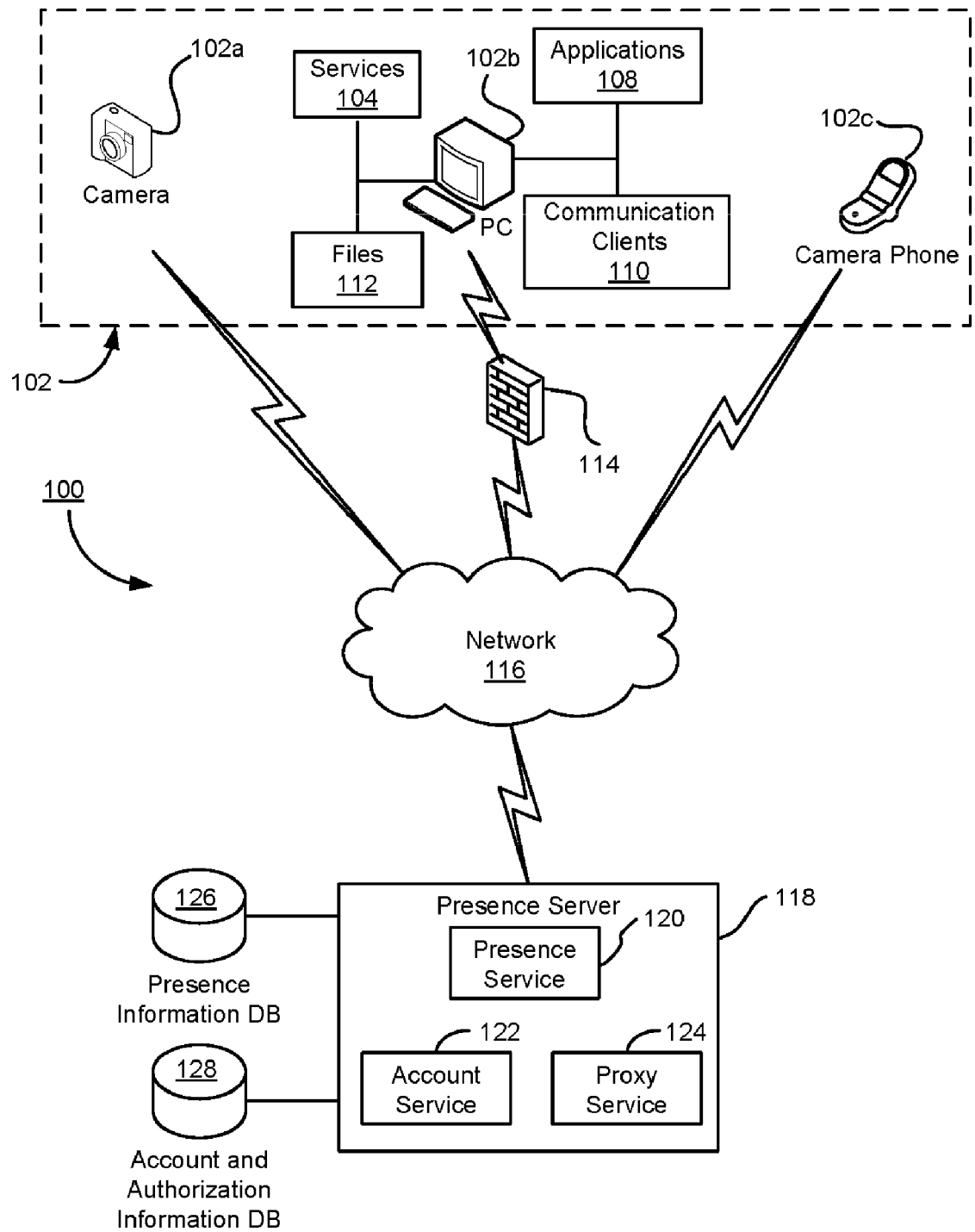
FIG. 1 illustrates a system for providing a general request/response protocol using a presence protocol according to an exemplary embodiment.

Various aspects will now be described in connection with exemplary embodiments, including certain aspects described in terms of sequences of actions that can be performed by elements of a computer system. For example, it will be recognized that in each of the embodiments, the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

When describing the architecture, models, and protocols associated with presence services, this document uses terms described in RFC 2778 and RFC 2779. While the various presence service and presence protocol embodiments used today have differences, all of these embodiments use presence architectures and protocols that are consistent with the presence model and protocols described in RFC 2778 and RFC 2779 in terms of features and function. Accordingly, the terms used here should not be limited to any one of the presence models, services, and/or protocol embodiments in use today.

For example, today's presence protocols each support a common set of messages (or commands) from a functional standpoint (See, e.g., RFC 2779). These functional commands include:

Publish: Allowing a presence entity (through a PUA/presentity) to update/provide its own presence information (e.g. its status or contact information) to a presence server;

Notify: Allowing a presence server to provide information from a presence tuple to a WUA/watcher. Notifications may be point-to-point (e.g., via a directed publish/notify command as described in the following paragraph) or broadcast; and Subscribe (Unsubscribe): Allowing a WUA/watcher to subscribe or unsubscribe to notifications related to specific presence information.

The phrase "presence protocol", as used here, includes at least those commands to allow entities to publish presence information, notify entities of other entities' presence information, and allow entities to subscribe (unsubscribe) to other entities' presence information.

Several optional, functionally equivalent presence commands also exist. These optional commands include:

Probe: Allowing a presence service to get information associated with a presence entity. This is equivalent to a combined Notify/Publish command except that the presence service requests presence information rather than having the presence client send the information unsolicited; and Directed Publish/Notify: Allowing a client to issue a publish command that results in a notify command being sent to a specific presence client, thus bypassing the subscription function.

There is also a functional equivalent set of commands for managing a "friends list" (or "roster") related to presence services. This set of commands includes:

Request: Allowing a client to request a specific or default roster;

Add: Allowing a client to add an item for a presence entity to a roster;

Update: Allowing a client to update a roster item; and

Delete: Allowing a client to delete an item from a roster.

Related to rosters are privacy lists. A privacy list can be generally described in terms of a roster configured to identify presence clients that are to be blocked from interacting with the owner of the roster/privacy list.

Referring now to FIG. 1, a system 100 is depicted for providing a general request/response protocol using a presence protocol. The system includes a presence server 118 configured to receive, store, and distribute information via a presence service 120. The system further includes responding and requesting devices 102 configured to exchange information with the presence server 118 via the network 116 using a presence protocol. The responding and requesting devices 102 can include any of Personal Computers (PCs), Personal Digital Assistants (PDAs), network-enabled cameras, camera phones, cell phones, and the like.

Although depicted as a stand-alone server in FIG. 1, the presence server 118 can include several servers (not shown) that together can function as the presence service 120. Moreover, the function of the presence server 118 can be incorporated, either in whole or in part, into any of the devices 120 and server 118 shown in the figure, and thus can be distributed throughout the network of elements shown. As such, the meaning of "presence server" used here does not strictly conform to the definition of a "server" included in RFC 2778 as being an indivisible unit of a presence service. Nevertheless, the presence server 118 and presence service 120 are closely link to one another and can be considered to perform one and the same function. As used here, however, the presence server 118 can also include additional services, such as the account service 122 and proxy service 124 shown in FIG. 1, although these additional services need not be included in the server 118. It will be understood that these additional services can also be distributed across one or more servers or devices 102 interconnected via the network 116.

A responding device can be, for example, a PC, such as the PC 102b shown in FIG. 1. The responding device 102b includes access to at least one resource. The resource can be any service, application, file, or other information associated with the responding device that can be made available for use by or interaction with a requesting device, such as the camera 102a or camera phone 102c, via the network 116. For example, FIG. 1 shows that the responding device 102b can provide resources including services 104 (e.g., web services, such as a photo sharing website), software applications 108, and files 112 (such as image files). Requesting devices, such as the camera 102a or camera phone 102c, can request information or services related to these resources using the presence service 120 via the network 116.

Figure 2:
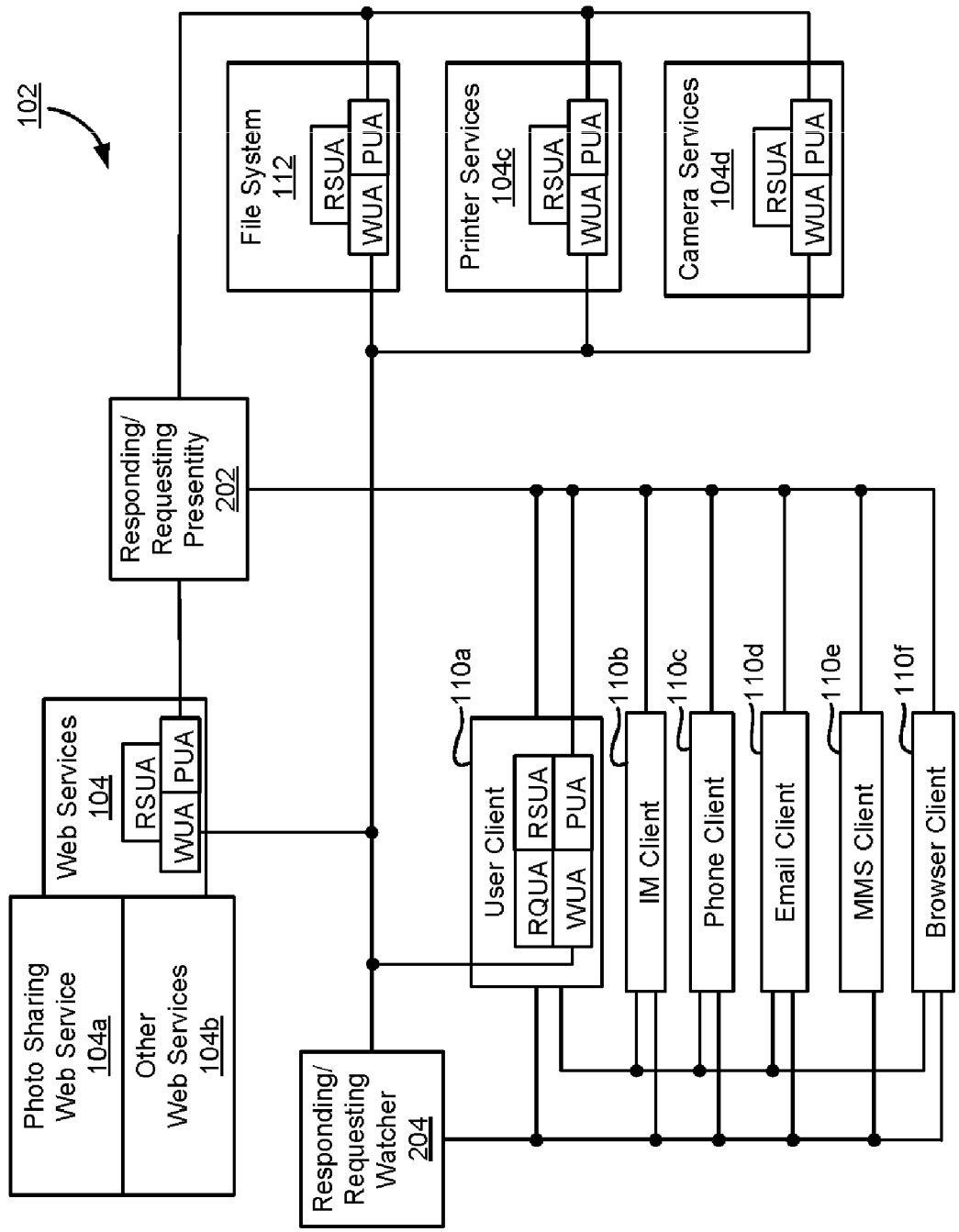
FIG. 2 is a block diagram illustrating the various components that can form a responding and/or requesting network devices according to an exemplary embodiment.

FIG. 2 is a block diagram illustrating the various components that can make up the responding and/or requesting network devices 102. For convenience, the arrangement shown in FIG. 2 represents a network device capable of functioning both as a responding device and as a requesting device. Nevertheless, persons skilled in the art will understand that a responding device need not include the components necessary to function as a requesting device, and vice versa. Moreover, the figure includes a responding/requesting presentity component 202 and responding/requesting watcher component 204. It will be understood that each of these components can be combined into a single respective presentity 202 or watcher 204 component, or can be implemented as separate responding and requesting entities as described below.

First consider the arrangement of FIG. 2 from the perspective of a responding device, such as the PC 102b. From this perspective, the arrangement includes a responding presentity component 202. According to an exemplary embodiment, the responding presentity component 202 can be configured to send a descriptor of the resource 104, 108, 112 to the presence server 118. The descriptor can include any information that describes and/or identifies any of the resources 104, 108, 112 available to the responding device, and can be used to advertise the availability of those resources to requesting devices for processing their requests.

For example, FIG. 2 shows that the responding device 102b has access to web services 104, including a photo sharing web service 104a and other web services 104b, a file system 112, printer services 104c, and camera services 104d. The descriptor can simply identify a resource by name or can include other information to describe or identify the resource to other presence entities coupled to the network 116 The responding presentity component 202 can send the descriptor of the resource to the presence server 118 by including the descriptor in presence information as described in conjunction with FIGS. 4-6 below. The presence information including the descriptor can be sent to the presence server 118 via the presence protocol using a publish command. The descriptor can thus be used to advertise the availability of the resource to other presence entities that are subscribed to the presence information of the responding device.

In an alternative embodiment, the responding presentity component 202 need not send the descriptor of the resource 104, 108, 112 to the presence server 118 to advertise the availability of the resource for processing requests. Instead, requesting devices coupled to the presence server 118 can broadcast a standardized request without a descriptor for processing by any of all of the resources 104, 108, 112 associated with responding devices coupled to the presence server 118 via the network 116.

Continuing to consider the arrangement of FIG. 2 from the perspective of the responding device 102b, the arrangement further includes a responding watcher component 204. The responding watcher component 204 is configured to receive from a requesting device (e.g., the camera phone 102c), via the presence server 118, the descriptor of the resource 104, 108, 112 and a request related to the resource. The presence server 118 can send the descriptor and the request to the responding watcher component 204 via the presence protocol using a notify command. The notify command including the descriptor and request may be sent to the responding watcher component 204 based on a subscription to the presence information of the requesting device 102c, as a result of a directed publish/notify command sent by the requesting device 102c for delivery to the responding device 102b, or in response to a fetch or polling request made by responding device 102b.

As described below in conjunction with FIGS. 4-6, the descriptor of the resource can be included in the request itself or can be included in the presence protocol commands, such as the notify command described above, used to carry the request from the requesting device to the responding device.

The descriptor can be used to associate the request with a particular resource 104, 108, 112 available to the responding device 102b, and the request message can be used to carry the resource request. As such, the responding device 102b can process multiple requests for different resources 104, 108, 112 corresponding to the various requesting devices 102c connected to the network 116.

Again considering the arrangement of FIG. 2 from the perspective of the responding device 102b, the responding presentity component 202 is further configured to send a response to the presence server 118 replying to the request message. The responding presentity component 202 can send the response to the presence server 118 by including the response in presence information as described in conjunction with FIGS. 4-6 below. The presence information including the response can be sent to the presence server 118 via the presence protocol using either a broadcast or directed publish command.

According to an exemplary embodiment, the responding device can include a responding user agent (RSUA). The RSUA component is coupled to the resource 104, 108, 112 and to the responding presentity 202 and watcher 204 components. Like the PUA and WUA components described above, the RSUA can interact with the responding presentity 202 and watcher 204 components on behalf of a principal. Generally, the RSUA will interact with the resource 104, 108, 112 as its principal, although the RSUA can also interact with an owner of the resource as well as other principals.

The RSUA component can be configured to facilitate a sending of the descriptor of the resource by the responding presentity component 202 to advertise the resource to other presence entities coupled to the network 116. The RSUA component can interact with the resource 104, 108, 112 directly to determine and publish the descriptor or can provide an appropriate interface for an owner of the resource to publish the descriptor of the resource using the presence protocol. To provide an interface for the owner of the resource, the RSUA can be coupled to a user communication client 110a or any number of associated communication clients, such as an IM communication client 110b, a phone client 110c, an email client 110d, a Multimedia Messaging Service (MMS) client 110d, and a browser client 110f (collectively, communication clients 110) as shown in FIG. 2.

Figure 3:
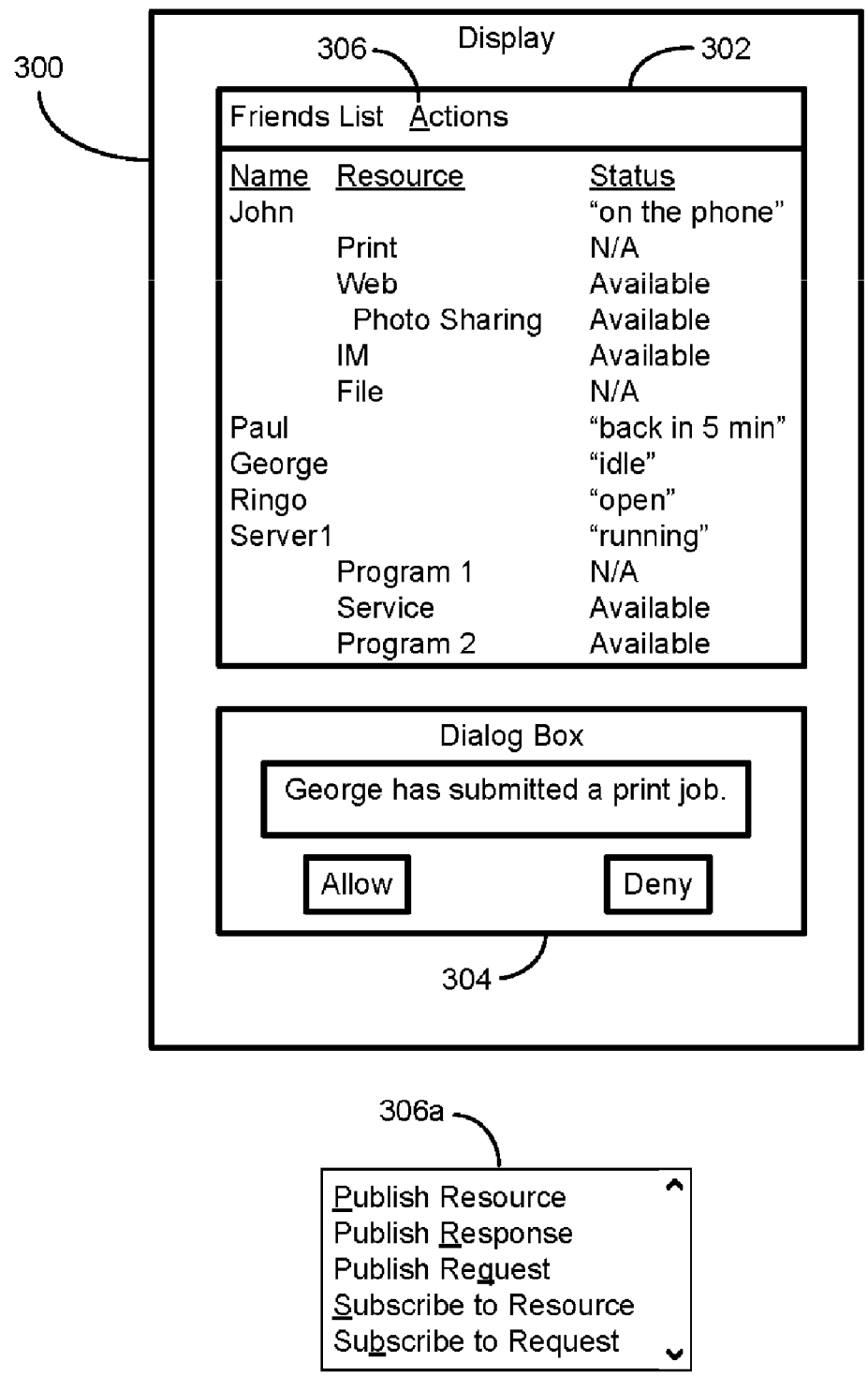
FIG. 3 illustrates an interface that may be used by an owner of the resource to interact with responding and/or requesting entity according to an exemplary embodiment.

For example, FIG. 3 illustrates an interface that may be used by an owner of the resource 104, 108, 112 to interact with the responding presentity component 202 to publish the descriptor of the resource. Using the IM client 110b, the exemplary interface can be presented on a display 300 in the form a "friends list" 302, recognizable to those familiar with IM applications. The friends list 302 can include the names of human resource owners, e.g., John, Paul, George, and Ringo, and/or non-human resource owners, e.g., Server1. The friends list 302 can also include information identifying the resources associated with each of displayed owners that are offered to authorized requesting entities, as well as a status of the offered resources. For example, the resources associated with John in the exemplary list 302 can include a print service that is not available (N/A), web services, including a photo sharing service that is available, an IM service that is available, and a file system that is not available (N/A).

The interface 302 can also include an Actions menu item 306, suitable for invoking commands associated with resources. The Actions menu can include entries 306a to publish a resource, publish a response to a request, publish a request associated with a resource, subscribe to information associated with a resource, and subscribe to information associated with a request related to resource. A corresponding dialog box (not shown) can be presented to gather the necessary information to perform the selected action.

The RSUA can be further configured to facilitate a processing by the resource 104, 108, 112 of the request received by the responding watcher component 204. The RSUA can be configured to forward the request to the appropriate resource 104, 108, 112 for processing or can interpret and/or pre-process the request prior to its being forward to the resource. For example, if the request were related to accessing the photo sharing web service 104a illustrated in FIG. 2, the RSUA could translate the request into an appropriate HTTP get request and then forward the request to the web service for processing (e.g., serving a requested photo web page).

The RSUA can facilitate the processing of the request without any user intervention or, if appropriate, can provide a suitable interface for gathering information, such as authorization, from an owner of the resource. For example, the interface 302 shown in FIG. 3 is illustrated as presenting a dialog box 304 indicating that a user, George, has requested access to a printer service (e.g., service 104c of FIG. 2) by submitting a print job request. The owner of the printer service can either accept or deny the request by selecting the appropriate dialog box control. If the request is accepted by the owner of the printer service, the RSUA can forward the request to the printer service, performing any translations of the request as needed.

In addition, the RSUA can be further configured to facilitate a sending of the response to the request by the responding presentity component 202. As with the publishing of the descriptor, the RSUA component can interact with the resource 104, 108, 112 directly to determine and publish the response to the request or can provide an appropriate interface for the owner of the resource to publish the response using the presence protocol. For example, upon selection of the "publish a response" entry included in the Action entry list 306a of FIG. 3, an appropriate dialog box (not shown) can be presented to gather the necessary information to form the response to the request. The RSUA can then forward the response to the responding presentity component 202 for publishing (perhaps with the assistance of an appropriate PUA), performing any translations of the response as needed.

In facilitating the exchange of information between the responding presentity 202 and watcher 204 components, the resource 104, 108, 112, and the communication clients 110, the RSUA may act in conjunction with appropriate PUAs and/or WUAs or may bypass the operation of these agents. Moreover, it will be understood that the RSUA for a particular resource can be combined with the PUA and/or WUA associated with that resource, or can be configured to act as a responding user agent for all resources associated with a particular device and/or owner. As with PUAs and WUAs, the RSUA can be implemented such that its functionality exists within the presence service, external to the presence service, or a combination or both internal and external to the presence service.

Consider now the arrangement of FIG. 2 from the perspective of a requesting device, such as the camera phone 102c shown in FIG. 1. From this perspective, the arrangement includes a requesting watcher component 204 which can be configured to receive the descriptor of the resource 104, 108, 112 if sent from the presence server 118. The presence server 118 can send the descriptor to the requesting watcher component 204 via the presence protocol using a notify command. The notify command including the descriptor may be sent to the requesting watcher component 204 based on a subscription to the presence information of the responding device 102b, as a result of a directed publish/notify command sent by the responding device 102b for delivery to the requesting device 102c, or in response to a fetch or polling request made by the requesting device 102c. The descriptor of the resource can be included in presence information associated with the responding device or can be included in the presence protocol commands, such as the notify command described above, used to carry the presence information from the responding device to the requesting device.

Continuing to consider the arrangement of FIG. 2 from the perspective of the requesting device 102c, the arrangement further includes a requesting presentity component 202 configured to send the descriptor and the request related to the resource to the presence server 118. The requesting presentity component 202 can send the request to the presence server 118 by including the request in presence information as described in conjunction with FIGS. 4-6 below. The descriptor of the resource can be included in the request itself or can be included in the presence protocol commands used to carry the presence information including the request from the requesting device to the responding device. The presence information including the request can be sent to the presence server 118 via the presence protocol using either a broadcast or directed publish command.

Again, considering the arrangement of FIG. 2 from the perspective of the requesting device 102c, the requesting watcher component 204 is further configured to receive via the presence server 118 the response replying to the request message. The presence server 118 can send the response to the requesting watcher component 204 via the presence protocol using a notify command. The notify command including the response may be sent to the requesting watcher component 204 based on a subscription to the presence information of the responding device 102b, as a result of a directed publish/notify command sent by the responding device 102b for delivery to the requesting device 102c, or in response to a fetch or polling request made by the requesting device 102c.

According to an exemplary embodiment, the requesting device can include a requesting user agent (RQUA) component coupled to the requesting presentity 202 and watcher 204 components. Like the RSUA, the RQUA can also be coupled to the communication clients 110a-110f shown in FIG. 2 for interacting with a user/principal of the requesting device 102c. The RQUA can be configured to facilitate a presentation of the descriptor received by the requesting watcher component 204. For example, using the IM client 110b, the RQUA can present a descriptor of a resource received by the requesting watcher component 204, such as the photo sharing web service shown as being owned by John or the programs and service shown as being owned by Server1 in FIG. 2. The descriptor can be presented in the interface 302 together with information describing the owner of the resource and a status of the resource.

The RQUA can also be configured to facilitate a sending of the request by the requesting presentity component 202. The request can be automatically generated by the RQUA in response to some other action occurring in relation to the resource, e.g., an action by a related program running on the requesting device 102c. Alternatively, an interface, such as the interface 302 shown in FIG. 3, can be presented to a user/principal of the requesting device 102c to gather information needed to form the request. For example, upon selecting the "publish a request" Action entry 306a, a corresponding dialog box (not shown) can be presented to a user/principal to gather the necessary information to form the request. The RQUA can then forward the request to the requesting presentity component 202 for publishing (perhaps with the assistance of an appropriate PUA), performing any translations of the request as needed.

The RQUA can also be configured to facilitate a presentation of the response received by the requesting watcher component 204. For example, if the response were to include a web page served from the photo sharing web service 104a of the responding device 102b illustrated in FIG. 2, the RQUA could invoke the browser client 110f of the requesting device 102c shown in the figure to display the served web page. Thus, the RQUA can effectively establish itself as a proxy for processing requests directed to and responses received from presence server 118. Alternatively, the RQUA can present a dialog box to receive authorization or additional information from a user/principal prior to acting on the response.

In facilitating the exchange of information between the requesting presentity 202 and watcher 204 components and the communication clients 110, the RQUA may act in conjunction with appropriate PUAs and/or WUAs or may bypass the operation of these agents. As with PUAs and WUAs, the RQUA can be implemented such that its functionality exists within the presence service, external to the presence service, or a combination or both internal and external to the presence service.

Referring again to FIG. 1, the presence server 118 can include the proxy service 124. The proxy service 124 can be configured to send the request to the responding watcher component 204 through a firewall 114 associated with the responding device 102b or to send the response to the requesting watcher component through a firewall (not shown) associated with the requesting device 102c. According to another exemplary embodiment, the presence server 118 can also include the account service 122. The account service 122 can be configured to authenticate an identity of each of the requesting and responding devices and to authorize a receiving by each of the devices of the request or the response prior to sending the request or response to the respective entity.

Rosters and/or privacy lists may be used by the account service 122 to authorize and authenticate access to a particular resource or to prevent providers from advertising certain resources to subscribers. In this sense, the rosters and/or privacy lists can operate as access control lists (ACLs) for authenticating and authorizing resource usage among presence entities. The roster and/or privacy list data can be stored in a database, such as the account and authorization information database 128 coupled to the account service 122. Multiple rosters and/or privacy lists may be maintained in the database 128 and used by the service 122. No new extension to the account service protocol for roster management is required to maintain the rosters or lists, however, the roster data can instead be included in presence information and carried by the presence protocol.

Figure 4:
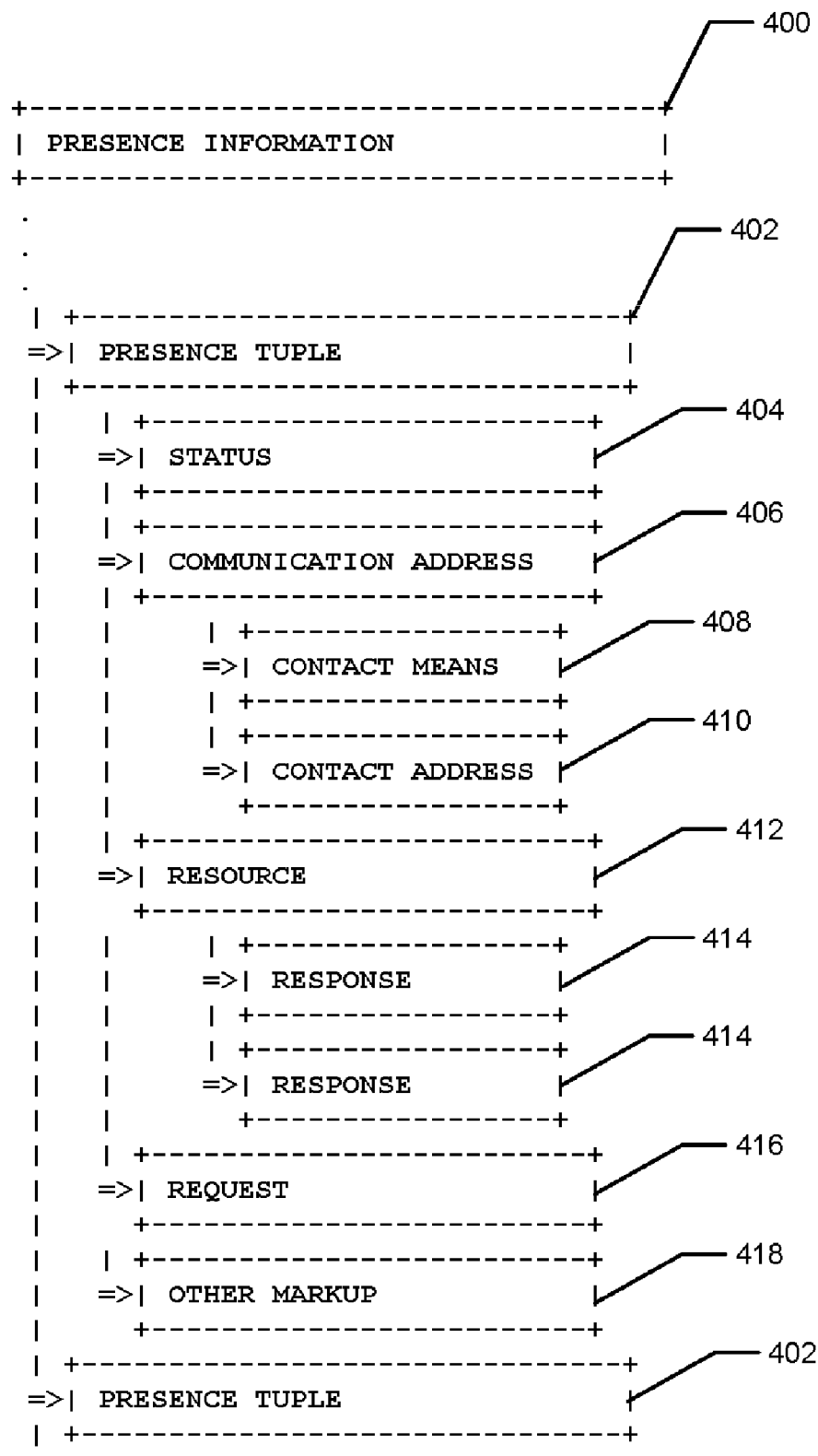
FIG. 4 illustrates a data structure for use with a presence protocol in providing a general request/response protocol according to an exemplary embodiment.

Referring now to FIG. 4, a data structure is illustrated for use with a presence protocol in providing a general request/response protocol. For convenience, the data structure shown in FIG. 4 includes data objects and elements for storing the presence information of both a responding entity and a requesting entity. Nevertheless, persons skilled in the art will understand that a data structure for storing the presence information associated with a responding device need not include the objects and elements necessary to store the presence information of a requesting device, and vice versa.

Should the data structure of FIG. 4 include data objects and elements for storing the presence information of both a responding and requesting entity, one of the following arrangements may exist: 1) the responding and requesting entities are associated with the same principal, and are responding to and making requests related to different resources; or 2) the responding and requesting entities are associated with different principals, and are responding to and making requests related to a common resource. This second arrangement requires a change to the standard presence services access control policies, and could lead to a more complex access control system. Nevertheless, performing the entire request/response transaction using information stored in a single presence tuple associated with the resource or owner of the resource could lead to efficiencies in data storage usage and data exchange.

The data structure shown in FIG. 4 may be contained in any suitable computer readable medium, including any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium, such as a removable storage device. More specific examples (a non-exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

The data structure shown in FIG. 4 represents presence information 400 that includes an enhanced presence tuple 402. The presence information 400 can be stored in a database coupled to the presence server 118 shown in FIG. 1, such as the presence information database 126. Although a single database 126 is shown in FIG. 1, persons skilled in the art will understand that the presence information can be distributed throughout the network 116 across multiple databases and/or stored, at least in part, in memory associated with the requesting and/or responding devices 102 shown in FIG. 1.

The presence tuple 402 shown in FIG. 4 includes standard data objects for storing the status 404 and communication address 406 information described in RFC 2778 and RFC 2779. The presence tuple 402 also includes data objects for storing a contact means 408 and contact address 410, as well as a data object for storing other markup 418, thus maintaining the extensibility of the tuple 402 in accordance with presence standards. Because the presence tuple 402 maintains the standard form for presence information described in RFC 2778 and RFC 2779, the presence information 400 can be carried across the network 116 using standard presence protocol commands. It is not necessary that the presence server 118 to understand the content of the tuple 402 in order to route the information contained therein to the various presence entities coupled to the network 116.

Considering first the data structure of FIG. 4 from the perspective of a responding entity, to provide a general request/response protocol using a presence protocol, the presence tuple 402 includes a resource data object 412, including an element (not expressly shown) for storing a descriptor of a resource associated with a responding entity. As described in conjunction with FIGS. 1-3 above, the descriptor can include any information that describes and/or identifies the resource available to the responding entity, such as any of the resources 104, 108, 112 shown in FIG. 1. The responding entity can be, for example, the responding presentity component 202 shown in FIG. 2. According to an exemplary embodiment, the resource data object 412 can also include at least one element (not expressly shown) for storing information describing the requests supported by the resource, including information describing the types of functions and requests that the resource can support and information describing how to format the requests. The resource data object 412 can also include at least one element (not expressly shown) for storing information describing the responses available for replying to the requests supported by the resource.

Now, considering the data structure of FIG. 4 from the perspective of a requesting entity, the presence tuple 402 also includes a request data object 416. The request data object includes an element for storing a request from a requesting entity related to the resource. The requesting entity can be, for example, the requesting presentity component 202 shown in FIG. 2.

Figure 5A:
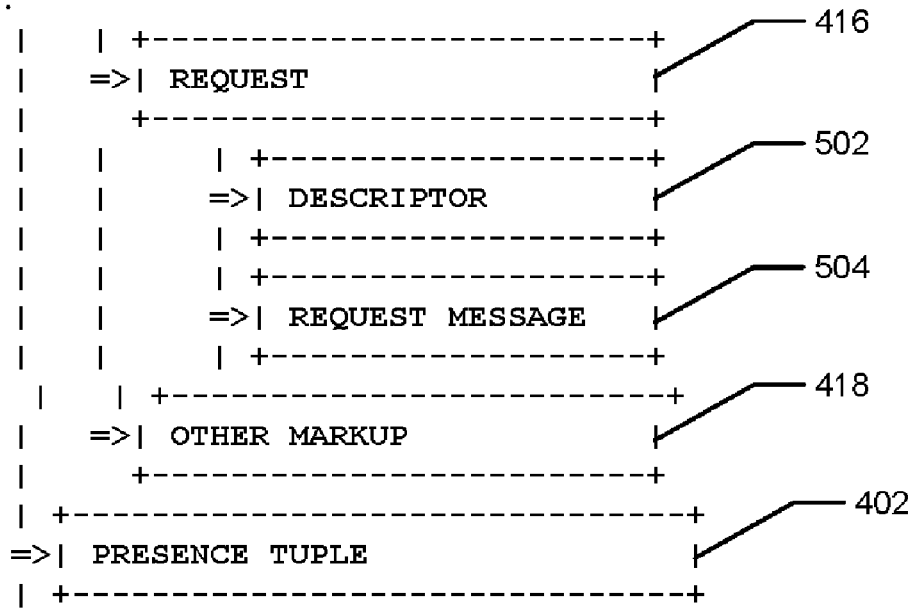
FIGS. 5A and 5B show an expanded view of a request data object included in the data structure of FIG. 4 according to an exemplary embodiment.

FIG. 5A shows an expanded view of the request data object 416 according to an exemplary embodiment. As shown in the figure, the expanded view of the request data object 416 can include an element for storing a request message 504 related to the resource. The request data object 416 can also include a descriptor element 502 for storing a descriptor of a resource associated with the responding entity. The descriptor element 502 can include information to describe or identify only the resource, or can include information to describe or identify both the responding entity and its associated resource(s), such as a Uniform Resource Identifier (URI).

For example, consider the following XML-based message published by a requesting entity ("customer@isp.net") for notification to an online store, "online.com" that includes a service (or resource) for ordering books:

<presence
from='customer@isp.net'
to='sales@online.com'
xml:lang='en'>
<request>
<descriptor>books</descriptor>
</request>
</presence>

The descriptor stored in element 502 could be simply "books" (as indicated) to identify the resource, or the descriptor could be a full URI, e.g., "sales@online.com/books", to identify both the responding entity (e.g., by node and domain name) and the resource. It should be understood that the responding entity can correspond to the resource itself, and thus the descriptor can describe or identify the responding entity/ resource using a simpler URI, such as the URI "books@online.com". The presence server 118 can use the descriptor stored in the element 502 both to route the request message stored in element 504 to the requesting entity/resource (e.g., using the node and domain portion of a URI descriptor) and to describe or identify the resource to process the request (e.g., using the identifier portion of a URI descriptor).

It can be useful to include the descriptor in the request under circumstances when the requesting entity's identifying information is being sent to all watching entities that may be subscribed to the request or when the presence information that includes the request is being broadcast to all watching entities coupled to the network 116 (i.e., when a directed publish/notify command is not used). For example, consider the following XML-based message published by a requesting entity ("customer@isp.net") for broadcast to any available responding entity/resource:

<presence
from='customer@isp.net'
xml:lang='en'>

-continued

```
<request>
    <descriptor>sales@online.com/books</descriptor>
</request>
</presence>
```

Broadcasting to all entities can be useful when the responding entity has not subscribed to at least the presence information of the requesting entity that includes the request.

Figure 5B:
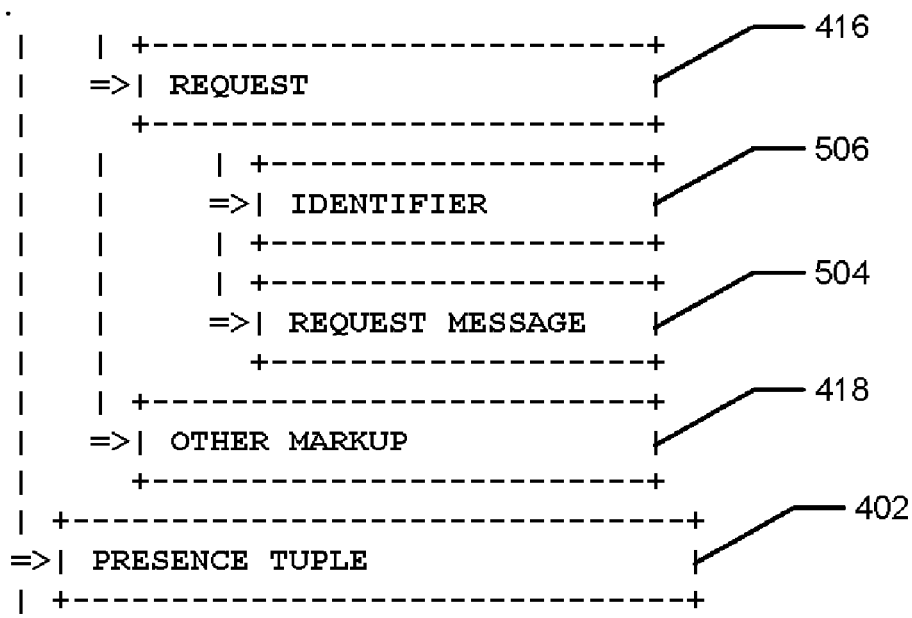

FIG. 5B shows an expanded view of the request data object 416 according to an alternative embodiment. In this embodiment, the request data object 416 does not include an element for storing the descriptor of the resource associated with the responding entity (e.g., element 502 shown in FIG. 5A). Instead, the descriptor of the resource can be included in the presence protocol commands used to carry the request from the requesting device to the responding device. For example, consider the following XML-based message published by a requesting entity ("customer@isp.net") for notification to the online store described above:

```
<presence
    from='customer@isp.net'
    to='sales@online.com/books'
    xml:lang='en'>
    <request> ... </request>
</presence>
```

Rather than including the descriptor for the "books" service offered by the online store in the request message itself (e.g., between the <request> and </request> elements of the message), the descriptor can be included in a presence attribute, "sales@online.com/books", used by the presence server 118 to route the notify portion of the directed publish/notify command to the responding entity.

It can also be useful for the requesting entity to broadcast a standardized request without a particular resource descriptor when the requesting entity has no preference as to the responding entity/resource that processes and responds to the request. Consequently, the request can be processed by any available responding entity/resource. For example, consider the following XML-based message published by a requesting entity ("customer@isp.net") for broadcast to any available responding entity/resource:

```
<presence
    from='customer@isp.net'
    xml:lang='en'>
    <request> ... </request>
</presence>
```

Since the broadcast message including the request does not include a descriptor of a resource to process the request (either in a presence attribute of the message or in the request itself), any watching entity/resource can evaluate the request, and process and respond to the request if appropriate.

In a related embodiment, the request data object can also include an element for storing an identifier of the responding entity. For example, the expanded view of the exemplary request data object 416 shown in FIG. 5B includes an identifier element 506 for storing an identifier of the responding entity. The identifier can be a URI including a node and domain of a responding entity, such as "sales@online.com". Such an identifier can be used by the requesting entity when broadcasting a request to all watching entities (e.g., for notice purposes), but when the request is to be processed by only the responding entity corresponding to the identifier.

For example, consider the following XML-based message published by a requesting entity ("customer@isp.net") for broadcast to any available responding entity/resource, but including an identifier in the request for identifying a responding entity having a resource available to process the request:

```
<presence
    from='customer@isp.net'
    xml:lang='en'>
    <request>
        <identifier>sales@online.com</identifier>
    </request>
</presence>
```

In this sense, the identifier stored in element 506 serves a similar function to the descriptor stored in element 502 of the arrangement shown in FIG. 5A. The identifier, however, need not include a descriptor of the resource used to process the request. Thus, if the responding entity corresponding to the identifier has access to a number of resources, any one of those resources can be used to process the request.

According to another exemplary embodiment, the request message stored in element 504 can be an XML-based message formed in the structure of a SOAP message. SOAP is a standard for exchanging XML-based messages over a computer network, typically using HTTP. SOAP forms the foundation layer of a protocol stack for providing web services. The standard provides a basic messaging framework that more abstract layers in the stack can build on.

There are several different types of messaging patterns available in SOAP, but the most common is the Remote Procedure Call (RPC) pattern, where one network node (the client) sends a request message to another node (the server), and the server immediately sends a response message to the client. SOAP originally was an acronym for Simple Object Access Protocol, but the acronym has been dropped in Version 1.2 of the SOAP specification. A primer for this version of the standard, published by the World Wide Web Consortium (W3C) XML Protocol Working Group could be downloaded or viewed from http://www.w3.org/TR/2003/REC-soap12-part0-20030624/ at the time this application was filed.

Referring once again to the data structure of FIG. 4 from the perspective of a responding entity, the presence tuple 402 also includes a response data object 414 including an element for storing a response from the responding entity replying to the request message. The responding entity can be, for example, the responding presentity component 202 shown in FIG. 2. It should be noted that FIG. 4 depicts two response data objects 414 linked to the resource data object 412 in the presence tuple 402. Such an arrangement allows for the efficient storage and management of the information needed to respond to multiple requests (from, e.g., multiple presence entities) that are related to a common resource. Nevertheless, the arrangement shown in FIG. 4 is merely exemplary, and other arrangements for storing and managing the resource, request, and response information are within the scope of the techniques describe here.

Figure 6:
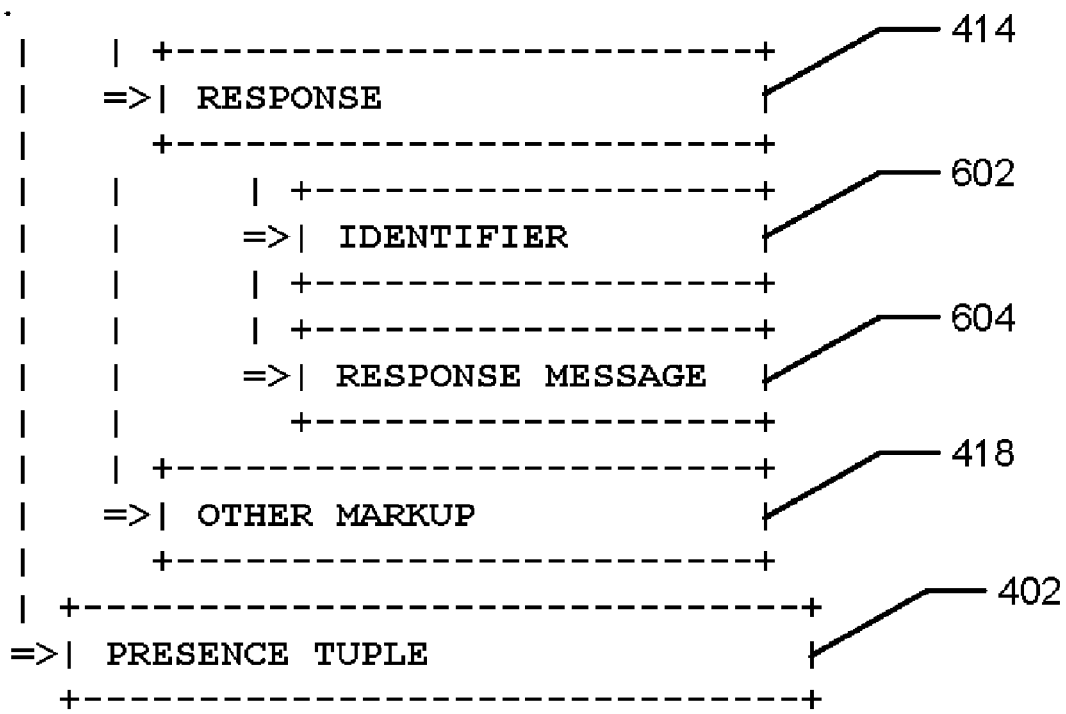
FIG. 6 shows an expanded view of a response data object included in the data structure of FIG. 4 according to an exemplary embodiment.

FIG. 6 shows an expanded view of the response data object 414 according to an exemplary embodiment. As shown in the figure, the expanded view of the response data object 414 can include an element for storing a response message 604 replying to the request message stored in element 504. Similar to the request message, the response message stored in element 604 can be an XML-based message formed in the structure of a SOAP message.

The response data object 414 can also include an identifier element 602 (similar to the identifier element 506 shown in FIG. 5B) for storing an identifier, such as a URI, of the requesting entity. The presence server 118 can use the identifier stored in the element 602 to route the response message stored in element 604 of the presence tuple 402 to the requesting entity. It can be useful for the presence server 118 to use this identifier under circumstances when both the responding entity's presence information is being broadcast to all presence entities coupled to the network 116 (i.e., when a directed publish/notify command is not used) and the requesting entity has not subscribed to at least the presence information of the responding entity that includes the response message, or when there is a need to notify other subscribed watchers of the response.

For example, consider the following XML-based message published by a responding entity ("sales@online.com") for broadcast to any available requesting entity:

```
<presence
from='sales@online.com'
xml:lang='en'>
<response>
<identifier>customer@isp.net</identifier>
</response>
</presence>
```

Notwithstanding the message being broadcast to all watching entities, the identifier can be used by the requesting entity ("customer@isp.net") to determine that the response is in reply to its own request. When there is no need to notify other subscribed watchers of the response, a directed publish/notify of the response to the requesting entity can be used, making it unnecessary to store the identifier of the requesting entity in the response data object 414.

Most presence protocols are XML-based (e.g., text-based) protocols. Should it be necessary to include binary data in either the request or response message, the binary data can be supported through the use of attachments. For example, the document "SOAP with attachments", published by the W3C and available for downloading or viewing from http://www.w3.org/TR/2004/NOTE-soap12-af-20040608/ at the time this application, describes SOAP support for binary attachments. Alternatively, binary data may be passed in the request/response messages by reference. That is, URIs may be passed in the XML-based request/response messages, using which a presence entity and/or agent may retrieve the binary data. It is preferred that binary data pass through and/or be stored in a presence tuple encoded in a text format, such that presence server 118 can apply security, tracking, and management services to this type of data as well by treating it just as any other piece of tuple data.

In an exemplary embodiment, the resource 412 and response 414 data objects can be included in a presence tuple associated with the resource or an owner of the resource. When the resource 412 and response 414 data objects are included in a presence tuple associated with the resource, the presence tuple associated with the resource can include a data object linking the presence tuple associated with the resource to a presence tuple associated with the owner of the resource.

Figure 7:
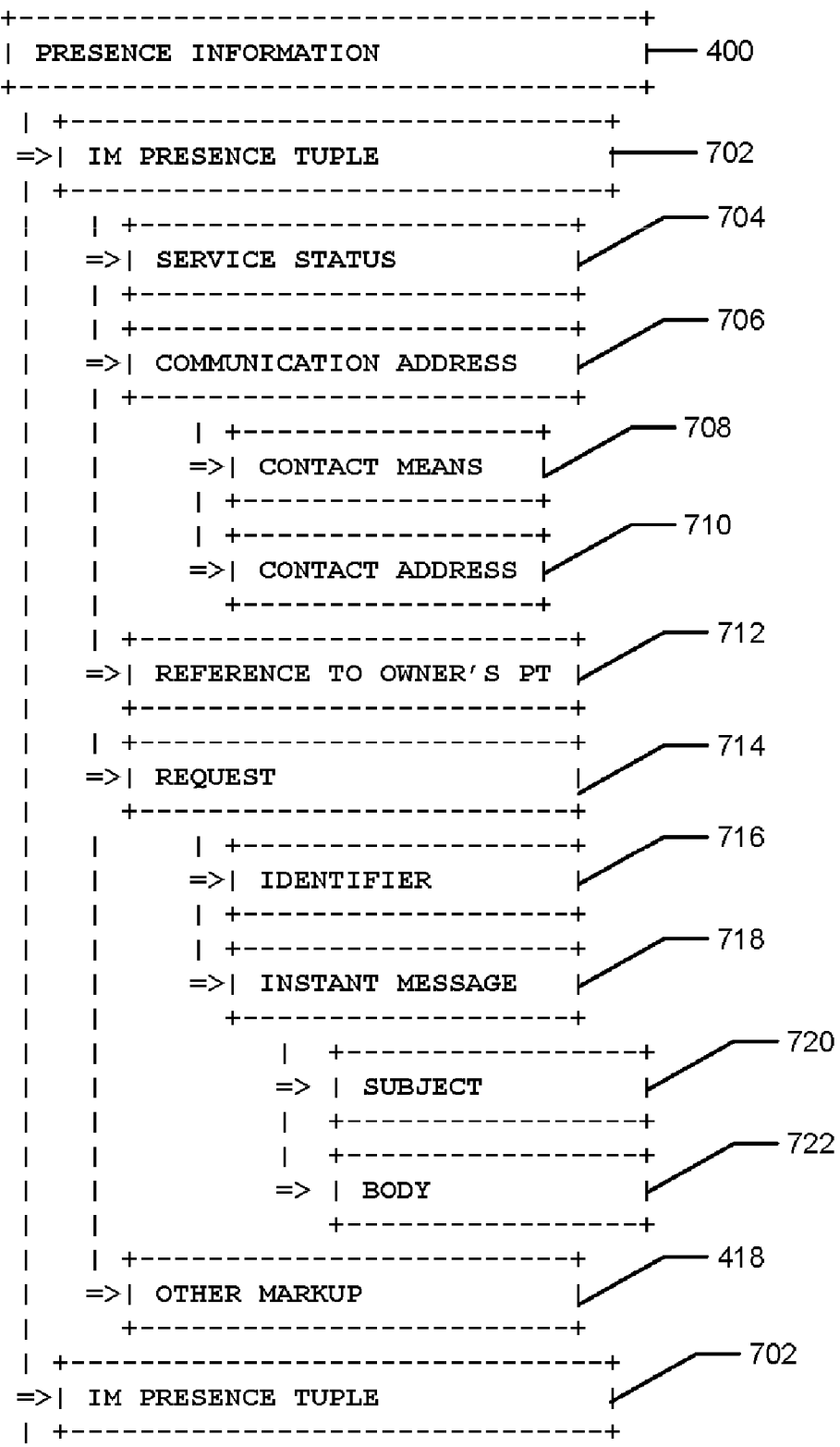
FIG. 7 depicts a data structure for storing presence information associated with an IM resource according to an exemplary embodiment.

For example, FIG. 7 depicts a data structure for storing presence information associated with an IM resource, such as the IM client 110b shown in FIG. 2. The presence information 400 includes an IM presence tuple 702 corresponding to the IM client 110b, and other IM presence tuples 702 corresponding to other IM clients (not shown) coupled to the network 116. The IM presence tuple 702 includes standard data objects for storing a service status 704, a communication address 706, including elements for storing a contact means 708 and contact address 710, and a data object for storing other markup information 418. The information stored in the status 704 and communication address 706 data objects can represent the status and communication address of an owner or principal associated with the IM client 110b and/or the status and communication address of the IM client 110b.

Since the IM presence tuple 702 is associated with a resource (e.g., the IM client 110b) and not the owner of the resource, the IM presence tuple 702 can also include a data object 712 for storing information linking information in the owner/principal's presence tuple (not shown) to the IM presence tuple 702. Moreover, since the IM present tuple 702 is itself associated with the resource, a resource data object, such as the resource data object 412 shown in FIG. 4, is not required. Instead, the descriptor of the IM service, along with any other information about the service, such as the types of functions and requests that the service supports and how to format requests to the service, can be stored in other data objects and/or elements (not expressly shown) of the IM presence tuple 702.

The IM presence tuple 702 can also include a request data object 714, including identifier 716 and message 718 elements, as well as subject 720 and body 722 sub-elements, for storing IM message information to send to other presence entities coupled to the network 116. A presentity associated with IM client 110e can use directed publish/notify commands to send messages to specific entities, or can broadcast messages to all subscribers to the IM presence tuple 702 information. Because the IM presence tuple 702 maintains the standard form for presence information described in RFC 2778 and RFC 2779, the presence information 400 can be carried across the network 116 using standard presence protocol commands. It is not necessary that the presence server 118 to understand the content of the tuple 702 in order to route the information contained therein to the various presence entities coupled to the network 116. Moreover, the arrangement shown in FIG. 7 allows both conventional presence information and IM messaging information to be carried solely by the presence protocol, eliminating the need to use a separate messaging protocol to send the IM message content.

In a related exemplary embodiment, the request data object 416 can be included in a presence tuple associated with the resource or a principal associated with the requesting entity. When the request data object 416 is included in a presence tuple associated with the resource, the presence tuple associated with the resource can include a data object linking the presence tuple associated with the resource to a presence tuple associated with the principal associated with the requesting entity.

Figure 8:
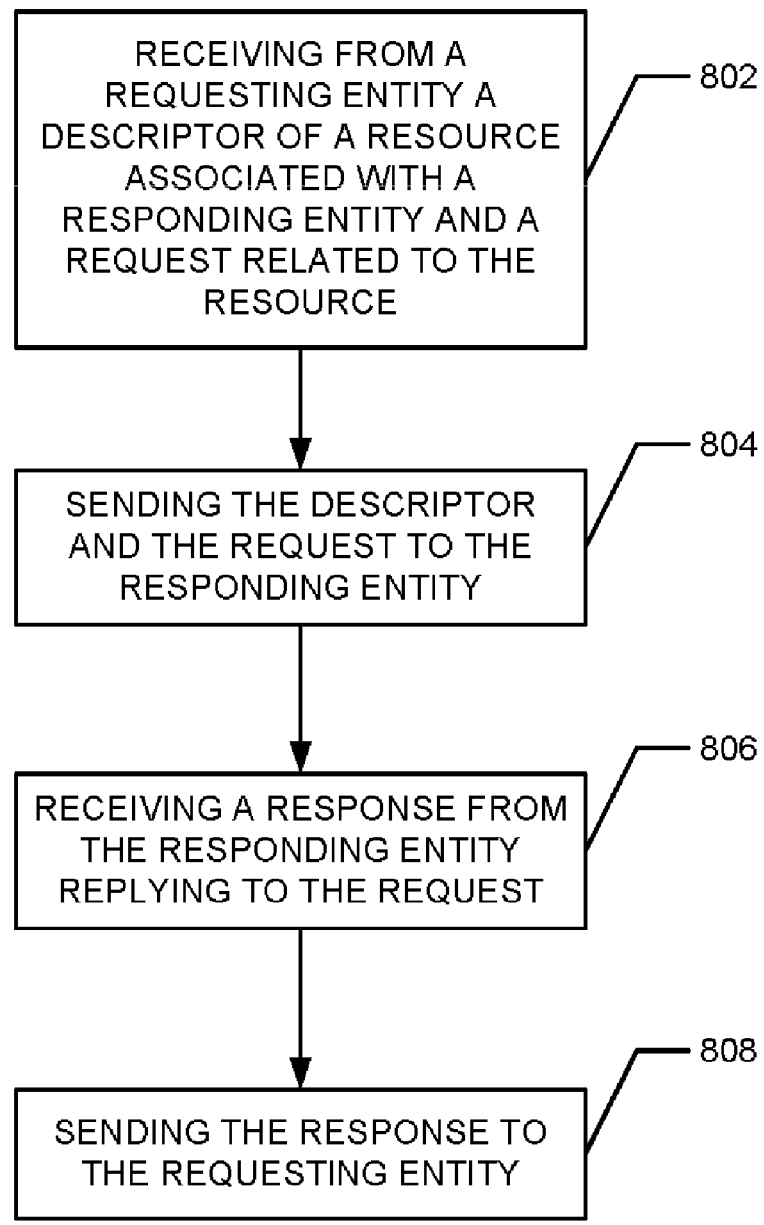
FIG. 8 is a flowchart illustrating a method for providing a general request/response protocol using a presence protocol according to an exemplary embodiment.

FIG. 8 is a flowchart illustrating a method for providing a general request/response protocol using a presence protocol. The method can be carried out using the arrangement described in conjunction with FIGS. 1-3 and the data structure described in conjunction with FIGS. 4-6 above, portions of which are referenced in the description that follows. In particular, the method can be carried out using the presence server 118. It will be understood that other arrangements and/or data structures can be used to carry out the described method without departing from the scope of the described techniques. Descriptions of certain terms, the meanings of which are described in detail above in conjunction with FIGS. 1-6, are not repeated here.

Moreover, the executable instructions of a computer program as illustrated in FIG. 8 for providing a general request/response protocol using a presence protocol can be embodied in any computer readable medium for use by or in connection with an instruction execution system, apparatus, or device, such as a computer based system, processor containing system, or other system that can fetch the instructions from the instruction execution system, apparatus, or device and execute the instructions.

The method begins in block 802, at which the presence protocol is used for receiving, from a requesting entity, a descriptor of a resource associated with a responding entity and a request related to the resource. For example, the presence server 118 can receive the descriptor and the request from the requesting presentity component 202 shown in FIG. 2. In block 804, the descriptor and the request are sent, e.g., from the presence server 118, to the responding entity, e.g., the responding watcher component 204. The descriptor can be included in the request as described above in conjunction with the request data object 416 shown in FIG. 5A. Alternatively, the descriptor can be included in each of respective presence protocol commands, e.g., publish and notify commands, used in receiving the request from the requesting entity and in sending the request to the responding entity.

A response from the responding entity, e.g. the responding presentity component 202 of FIG. 2, is received, e.g. by the presence server 118, in block 806. The response can include a response message replying to the request message, stored, for example, in element 604 of the data structure shown FIG. 6, and an identifier of the requesting entity, stored, for example, in element 602 of the data structure. In block 808, the response is sent, e.g., by the presence server 118, to the requesting entity, e.g., the requesting watcher component 204 shown in FIG. 2. Accordingly, a general request/response protocol is formed using the commands of a presence protocol.

According to an exemplary embodiment, the presence protocol can be used for receiving, e.g., by the presence server 118, the descriptor of the resource from the responding entity, e.g., the responding presentity component 202 shown in FIG. 2. The descriptor of the resource can be sent to the requesting entity based on a subscription established for the requesting entity to at least some presence information of the responding entity, for example, the presence information stored in the resource data object 412. The presence protocol can be used for automatically establishing a subscription for the responding entity to at least some presence information of the requesting entity, for example, the presence information stored in the request data object 416, when the subscription to the presence information of the responding entity is established for the requesting entity 102. The request sent to the responding entity can be based on the subscription automatically established for the responding entity. The automatic subscription provides an efficient mechanism of allowing the responding entity to be notified of requests from requesting entities that have subscribed to information associated with the resource.

If automatically establishing a subscription is not desired, the presence protocol can be used in an alternative embodiment for sending a notification to the responding entity indicating that the subscription to at least some of the presence information of the responding entity, for example, the presence information stored in the resource data object 412, is established for the requesting entity. A subscription request can be received from the responding entity in response to the notification, requesting a subscription to at least some presence information of the requesting entity, for example, the presence information stored in the request data object 416. The subscription to the presence information of the requesting entity can then be established for the responding entity based on the received subscription request. The request sent to the responding entity can then be based on the subscription established for the responding entity.

In another embodiment, the presence protocol can be used for sending the descriptor of the resource to the requesting entity in response to a fetching or a polling request by the requesting entity for at least some presence information of the responding entity. For example, rather than subscribe to the presence information of the responding entity to be notified when new resources are made available, the requesting entity can request that the presence server 118 probe the presence information of the responding entity on a periodic basis to determine if a new resource has been published, and to notify the requesting entity of such a publication.

The request sent to the responding entity can be based on a subscription established for the responding entity to at least some presence information, for example, the presence information included in the request data object 416, of the requesting entity. Alternatively, the request can be sent to the responding entity using an identifier of the responding entity included in presence information of the requesting entity. Thus, rather than notifying the responding entity of the request based on a subscription request, the presence server 118 can notify the responding entity of the request based on a directed publish/notify of the request information sent from the requesting entity. The request can also be sent to the responding entity in response to a fetching or a polling request by the responding entity for at least some presence information of the requesting entity. Accordingly, the presence server 118 can probe the presence information of the requesting entity on a periodic basis for the request information pursuant to a polling or fetch request received from the responding entity. The presence server 118 can then notify the responding entity of the request when detected via the probe command.

Likewise, the response sent to the requesting entity can be based on a subscription established for the requesting entity to at least some presence information, for example, the presence information included in the response data object 414, of the responding entity. Alternatively, the response can be sent to the requesting entity using an identifier of the requesting entity included in presence information of the responding entity. Thus, rather than notifying the requesting entity of the response based on a subscription request, the presence server 118 can notify the requesting entity of the response based on a directed publish/notify of the response information sent from the responding entity. The response can also be sent to the requesting entity in response to a fetching or a polling request by the requesting entity for at least some presence information of the responding entity. Accordingly, the presence server 118 can probe the presence information of the responding entity on a periodic basis for the response information pursuant to a polling or fetch request received from the requesting entity. The presence server 118 can then notify the requesting entity of the response when detected via the probe command.

According to an exemplary embodiment, the request can be included in presence information associated with the requesting entity but is not included in presence information associated with the responding entity. Similarly, the response can be included in the presence information associated with the responding entity but is not included in the presence information associated with the requesting entity. Consequently, each of the requesting and responding entities publish presence information only to their respective presence tuples. With such an arrangement, the presence service 120 and its underlying presence protocol need not be modified to allow for the exchange of request/response information included in the presence tuples.

In a related embodiment, the presence information associated with the responding entity can correspond to presence information of the resource or presence information of an owner of the resource. When the presence information associated with responding entity corresponds to presence information of the resource, the presence information of the resource can include a link to the presence information of the owner of the resource. In another related embodiment, the presence information associated with the requesting entity can correspond to presence information of a second resource associated with the requesting entity or presence information of an owner of the second resource, the second resource being configured to form the request. The reader is referred to FIG. 7, depicting a data structure for storing presence information associated with an IM resource, and its associated text for details regarding the linking of presence information of a resource and the presence information of an owner/principal of the resource.

According to an exemplary embodiment, an identity of each of the requesting and responding entities can be authenticated and a receiving by each of the entities of the request or the response can be authorized prior to sending the request or response to the respective entity. For example, as described above, the presence server 118 can include the account service 122 configured to authenticate an identity of each of the requesting and responding devices and to authorize a receiving by each of the devices of the request or the response prior to sending the request or response to the respective entity. In addition, rosters and/or privacy lists may be used by the account service 122 to authorize and authenticate access to a particular resource or to prevent providers from advertising certain resources to subscribers.

In another exemplary embodiment, a proxy service can be provided for sending the request to the responding entity through a firewall associated with the responding entity or for sending the response to the requesting entity through a firewall associated with the requesting entity. For example, referring to FIGS. 1 and 2, the presence server 118 can include a proxy service 124 configured to send the request to a responding watcher component 204 through a firewall 114 associated with the responding device 102b, or to send the response to a requesting watcher component through a firewall (not shown) associated with the requesting device 102c.

According to another embodiment, the presence protocol can be used for receiving from the responding entity a second descriptor of a second resource associated with a second responding entity and a second request related to the second resource. The second request can be related to the response replying to the request from the requesting entity. The presence protocol can also be used for sending the second descriptor and the second request to the second responding entity. Consequently, the original responding entity can function as a requesting entity and can make requests of other responding entities when processing the original received request. Such an arrangement can be used to support workflows among various presence entities to efficiently carry out complex multi-entity transactions.

Figure 9:
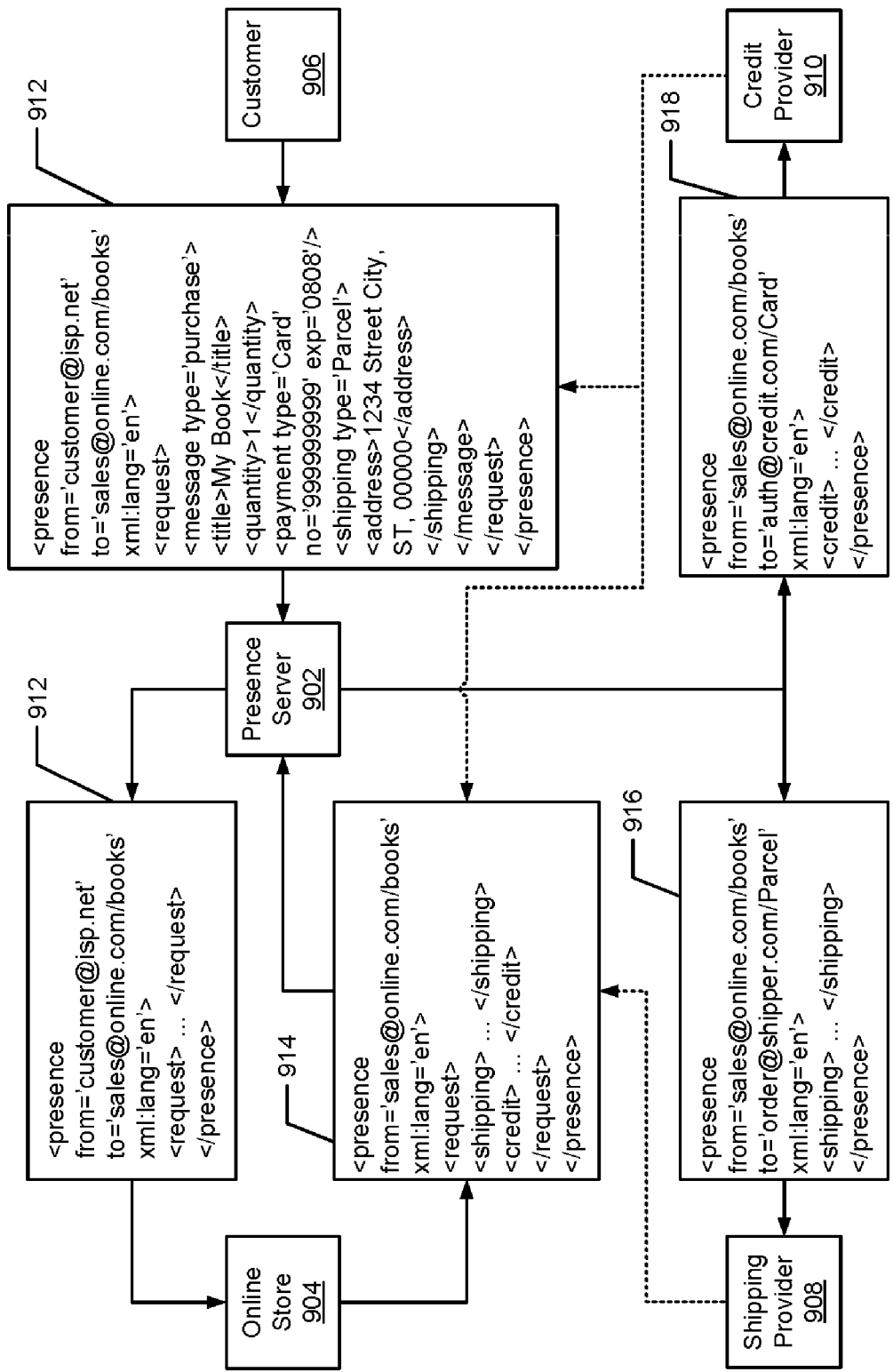
FIG. 9 illustrates an exemplary flow of information occurring among presence entities in carrying out a multi-entity transaction.

For example, FIG. 9 illustrates the flow of information among presence entities that can occur in carrying out a multi-entity online purchase transaction. The arrangement of FIG. 9 includes a presence server 902 and presence entities representing a customer 906 and an online store 904. Additional presence entities representing a shipping provider 908 and a credit provider 910 are also shown. The customer entity 906 can begin a transaction by publishing, to the presence server 902, presence information 912 including a request to purchase a book from the online store entity 904. The presence information 912 includes an identifier ("customer@isp.net") of the customer entity 906 as a "from" presence attribute, and an identifier/descriptor ("sales@online.com/books") of a resource associated with the online store entity 904 as a "to" presence attribute of a directed publish/notify command. Alternatively, the presence information 912 could be broadcast to the presence server 902 by the customer entity 906.

The request included in the presence information 912 can include information specifying the title of the book ("My Book"), the quantity to be ordered ("1"), payment information, including a payment type, such as a credit card ("Card"), and other related payment information including a card number ("999999999") and expiration date ("0808"). The request can also include shipping information, including a shipping type, such as by parcel post ("Parcel"), and other related shipping information including a shipping address ("1234 Street City, ST, 00000").

Once published, the presence information 912 including the request can be sent by the presence server 902 to the online store entity 904. The presence information 912 including the request can be sent to the online store entity 904 via the notify portion of a directed publish/notify command (as shown), or can be sent via a notify command in response to a subscription by the online store entity 904 to the presence information 912 of the customer entity 906. The request can then be processed by the online store's "books" service. In processing the request from the customer entity 906, the online store entity 904 may broadcast requests to the presence server 902 for notification to other responding entities, such as the shipping 908 and credit 910 provider entities. Each of these entities can be subscribed to the presence information 914 of the online store entity 904 as denoted by the dotted lines included in the figure. The presence information 914 broadcast by the online store 904 entity can include requests for the shipping 908 and credit 910 provider entities.

Each of the shipping 908 and credit 910 provider entities can receive notifications from the presence server 902 pursuant to their subscriptions to the presence information 914 of the online store entity 904. For example, the shipping provider entity 908 can receive presence information 916 including the online store's shipping request. The shipping request can result in one title of the book "My Book" being shipped to the address included in the presence information 912 of the customer entity 906. In addition, the credit provider entity 910 can receive presence information 918 including the online store's credit request. The credit request can result in credit from the account "999999999" being provided by the credit provider entity 910 on behalf of the customer entity 906 for the purchase price of the book.

Note that the credit provider entity 910 can also be subscribed to the presence information 912 of the customer entity 906 (again, as denoted by the dashed line in the figure). As a result of the subscription, the credit provider entity 910 can preprocess a request for credit from the online store 904 on behalf of the customer entity 906 at the time the request to purchase the book is made by the customer entity 906. Consequently, credit can be pre-approved for the purchase at the time the order is fulfilled by the online store, resulting in an overall more efficient transaction.

In an alternate embodiment, rather than the online store entity 904 issuing a request directed to the shipping provider 908 and the credit provider 910 entities as described above, the shipping provider 908 and credit provider 910 entities can receive notifications related to their services pursuant to outstanding subscriptions to all responses published by the online store entity 904 that specify their services. Such an arrangement allows the shipping provider 908 and credit provider 910 entities to monitor the request/response transaction between the customer entity 906 and online store entity 904 for relevant transaction information.

For example, consider when the online store entity 904 publishes a response to the customer entity's 906 request for a book purchase, the customer can receive a notification that the order is "in process". The shipping provider 908 and credit provider 910 entities, which are subscribed to the published response, receive first notifications pursuant to their existing subscriptions. The credit provider entity 910 may ignore this first notification, for example, if shipping costs have not been calculated and included in the published presence information. The shipping provider entity 908 can publish data (or send the data outside the presence service or "out-of-band") to the online store 904 providing shipping charges and perhaps a pickup date.

The online store 904 entity can then update its response tuple with the new shipping information and publish this information to the presence server 902. At this point, the customer 906 entity can receive a notification with the new shipping information and perhaps a new transaction status indicator, such as "shipping approved". The credit provider entity 910 can receive a second notification based on its subscription to the online store entity's 904 response. The credit provider entity 910 can determine from the notification that a total transaction cost (e.g., cost of the book plus the new shipping charges) is now available. The credit provider entity 910 can then approve the charges and publish data (or send the data out-of-band) to the online store entity 904 indicating that the charge has been approved. The online store entity 904 can then publish new status information to the existing response tuple indicating that the status of the transaction is "order completed". The customer entity 906 can then receive a notification from the presence server 902 with the new status information.

Instead of the requesting and responding entities publishing presence information only to their respective presence tuples, a method is now described that allows a requesting entity to update the responding entity's presence information by adding a request related to the resource to the responding entity's presence tuple. With this methodology, the entire request/response transaction can occur using information stored in a single presence tuple. For example, the data structure shown in FIG. 4 can be configured to store the presence information of both a responding and requesting entity. But rather than the responding and requesting entities being associated with the same principal and configured to respond to and make requests related to different resources (as described in conjunction with method illustrated in FIG. 8), the responding and requesting entities can be associated with different principals and configured to respond and make requests related to a common resource.

As described above, such a methodology requires a change to the standard presence services access control policies, and could lead to a more complex access control system. Nevertheless, performing the entire request/response transaction using information stored in a single presence tuple associated with the resource or owner of the resource could lead to efficiencies in data storage usage and data exchange.

The exemplary method includes receiving presence information from a responding entity including a descriptor of a resource associated with the responding entity. A request is received along with a descriptor related to the resource from a requesting entity. The request include a request message related to the resource. The presence information of the responding entity is updated to include the request message. The presence information is received from the responding entity, including a response message replying to the request message. The response message is then sent to the requesting entity.

ILLUSTRATIVE EXAMPLE

Figure 10:
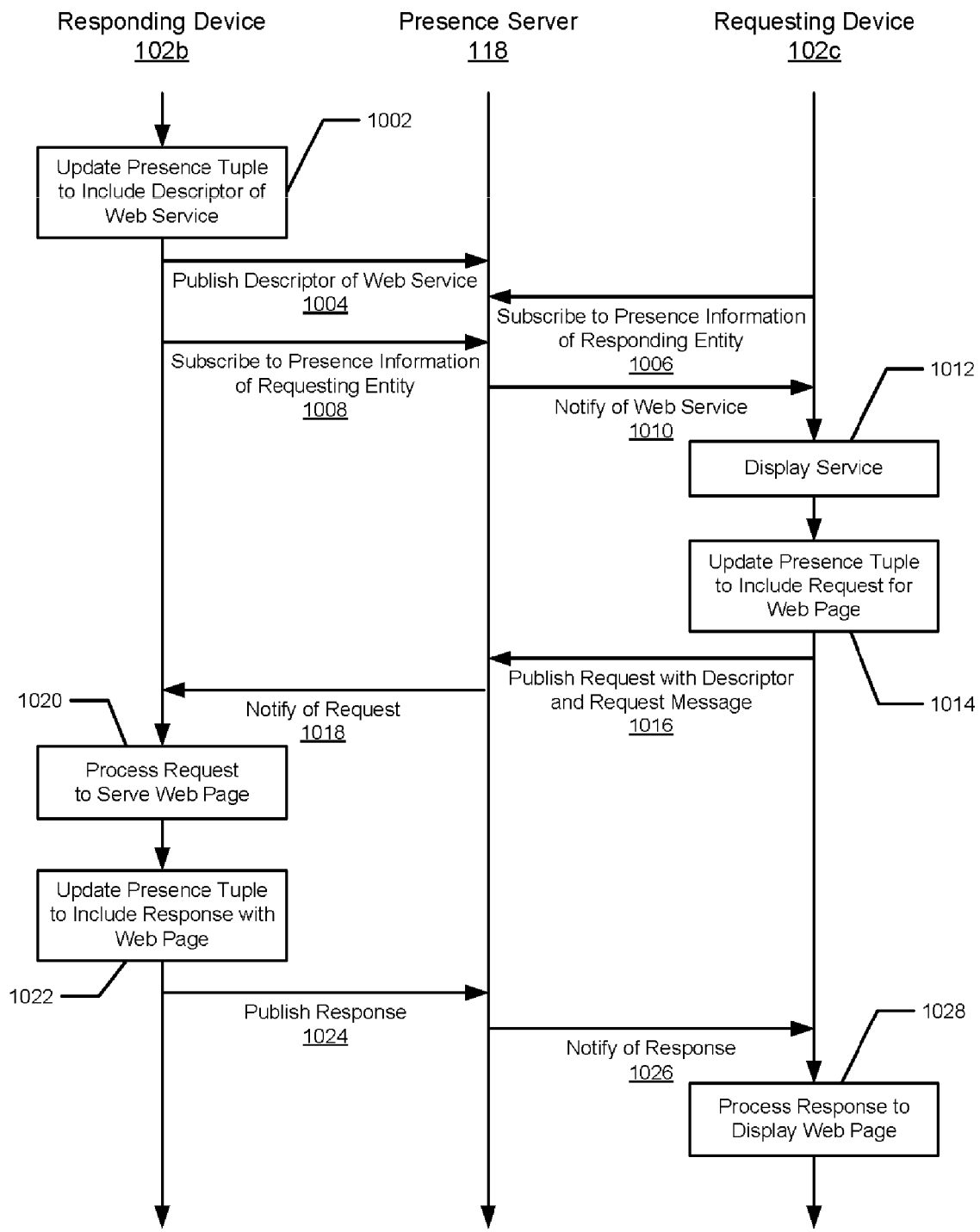
FIG. 10 is signal flow diagram for an illustrative request/response scenario according to an exemplary embodiment.

The following illustrative example is provided in conjunction with the signal flow diagram shown in FIG. 10 to clarify the concepts described above. The actions carried out in the example are for illustrative purposes, and should not be construed as being limiting in any way. Nor should the numerical order of the steps, either in the text below or as shown in FIG. 10, be construed as limiting or necessary in any way. In the example, users (through their presence entities and agents) are allowed to update only their own presence tuples. This approach allows a request response protocol to be provided using a presence protocol without having to change the structure of the underlying presence service.

The example is directed to an arrangement in which a standard presence tuple is extended to support a web service resource, such as the photo sharing web service 104*a* shown in FIG. 2. The photo sharing service can be a web site accessible or hosted by a responding entity, such as the PC 102*b*. The PC 102*b* can include a presentity component/PUA, a watcher component/WUA and various communication clients 110. The PC 102*b* can be protected by a firewall 114.

First, a resource data object 412 is added to a standard presence tuple 402 in the portion intended for extended data, as shown in FIG. 4. In the example, the presence tuple 402 corresponds to an owner, Xena, of the web service, but could correspond to the web server itself. The resource data object 412 is used to store information, such as a descriptor, related to the photo sharing service. In addition, one or more response data objects 414 are added to the presence tuple 402 to store responses to requests made to the service.

The resource 412 and response 414 data objects can be added to the presence tuple 402 using an RSUA associated with the photo sharing service. The RSUA is an extension to the Xena's presentity and also is configured to update the resource 412 and response 416 data objects of Xena's presence tuple 402 with corresponding service and response information. For example, the RSUA can detect the activity of the web site on the PC 102*b* and update, in action 1002, the service owner's (Xena's) presence tuple 402 with information, such as a service descriptor, related to the web service. The RSUA can then facilitate the advertising of the photo sharing service to other presence entities in action 1004 by instructing Xena's presentity (and any associated PUA) to publish the presence information including the descriptor of the photo sharing service.

In the example, a friend of Xena, Mike, operates a requesting device, such as the camera phone 102*c*. The camera phone 102*c* can include a presentity component/PUA, a watcher component/WUA and various communication clients 110, such as the IM client 102*b* and the browser 110*f* client. The browser client 110*f* can be used for exchanging information with web services, such as Xena's photo sharing service. The camera phone 102c can also be protected by a firewall (not shown).

Mike subscribes to Xena's presence tuple 402 in action 1006. Mike's subscription can cause a subscription to be automatically established to Mike's presence tuple on behalf of Xena's presentity in action 1008. Alternatively, Mike's presentity component can notify Xena of his subscription, allowing Xena to then request a subscription to Mike's presence tuple. The subscription to Mike's presence tuple allows Xena's watcher component to be notified of photo sharing service requests that are published with Mike's presence tuple. An account service 122 can be included in the presence server 118 for authenticating Mike's and Xena's identities to the other, and for authorizing the receiving of information from the presence service 118.

In action 1010, Mike's watcher receives a notify message from the presence server 118 in response to the subscription established in action 1006. A proxy service 124 can be used to route the notify message through Mike's firewall (not shown). The notify message sent in action 1006 includes the descriptor of Xena's photo sharing service. The camera phone 102c can include a RQUA that is configured to process Xena's presence information in cooperation the WUA. The RQUA can display the presence information, including the descriptor of the photo sharing service, in action 1012 using an appropriate communication client, such as the IM client 102b shown in FIG. 2.

The RQUA can also be configured to add a request data object 416 to Mike's presence tuple. The request data object 416 can be added to the portion of the presence tuple 402 intended for extended data, as shown in FIG. 4. In response to Mike selecting Xena's web service using the IM client 110f, the RQUA (in cooperation, perhaps, with the PUA) can use other information included in the resource data object 412 of Xena's presence tuple, such as information describing the form of service request, to include a request message in, action 1014, the request data object 416 of Mike's presence tuple along with the descriptor of the photo sharing service. The request can be for a web page advertised as being available through Xena's photo sharing server. The RQUA then instructs the camera phone's presentity to publish the request in action 1016.

In action 1018, the presence server 118 sends a notify command to Xena's watcher component pursuant to the subscription request established in action 1008. Again, the proxy service 124 can be used to route the notify message through Xena's firewall 114. Xena can be informed of the request, or the request can be automatically processed in action 1020 using the PC's RSUA and/or WUA. For example, the RSUA can convert the request for a particular web page into an appropriate HTTP request that can be routed to the photo sharing service for processing. The RSUA then receives the response from the photo sharing service, and perhaps converts the response to an appropriate message format for transmission. In action 1022, the response message is stored in the response data object 414 of Xena's presence tuple. The RSUA then instructs Xena's presentity to publish the presence tuple, including the response, to the presence server 118 in action 1024.

In action 1026, the presence server sends a notify command to Mike's watcher component pursuant to the subscription request established in action 1006, again perhaps using the proxy service 124. Mike can be informed of the response or the response can be automatically processed in action 1028 using the camera phone's RQUA and/or WUA. For example, the RQUA can convert the response message including the requested web page into an appropriate HTTP response that can be routed to Mike's browser client 110f for displaying the requested web page on the display of Mike's camera phone 102c.

Methods, system, and data structure for providing a general request/response messaging protocol using a presence protocol have been described. Using the techniques described here, the publish-subscribe mechanisms of the presence protocol can be expanded to provide general request/response services. The resultant general request/response protocol includes the advantageous features of a presence service, including authentication, authorization, security, and proxies for firewall piercing. The techniques described here allow for the development of enhanced applications, services, and workflows having characteristics not present in conventional applications, services, and workflows that use a presence protocol or a request/response protocol alone. In addition, the presence service supports centralized, distributed, peer-to-peer, and mixed architectures for implementing such enhanced applications, services, and workflows.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for providing a general request/response protocol, the method comprising:
    using a presence protocol for:
    receiving from a requesting entity a descriptor of a resource associated with a responding entity and a request related to the resource;
    sending the descriptor and the request to the responding entity;
    receiving a response from the responding entity replying to the request; and
    sending the response to the requesting entity.

2. The method of claim 1, comprising using the presence protocol for receiving the descriptor of the resource from the responding entity.

3. The method of claim 2, comprising using the presence protocol for sending the descriptor of the resource to the requesting entity based on a subscription established for the requesting entity to at least some presence information of the responding entity.

4. The method of claim 3, comprising using the presence protocol for
    automatically establishing a subscription for the responding entity to at least some presence information of the requesting entity when the subscription to the presence information of the responding entity is established for the requesting entity;
    wherein sending the request to the responding entity is based on the subscription automatically established for the responding entity.

5. The method of claim 3, comprising using the presence protocol for:
    sending a notification to the responding entity indicating that the subscription to at least some of the presence information of the responding entity is established for the requesting entity;

receiving a subscription request, sent from the responding entity in response to the notification, for a subscription to at least some presence information of the requesting entity; and establishing the subscription to the presence information of the requesting entity for the responding entity based on the received subscription request;

wherein sending the request to the responding entity is based on the subscription established for the responding entity.

6. The method of claim 3, comprising using the presence protocol for sending the descriptor of the resource to the requesting entity in response to a fetching or a polling request by the requesting entity for at least some presence information of the responding entity.

7. The method of claim 1, wherein sending the request to the responding entity is based on a subscription established for the responding entity to at least some presence information of the requesting entity.

8. The method of claim 1, wherein the request is sent to the responding entity using an identifier of the responding entity included in presence information of the requesting entity.

9. The method of claim 1, wherein the request is sent to the responding entity in response to a fetching or a polling request by the responding entity for at least some presence information of the requesting entity.

10. The method of claim 1, wherein sending the response to the requesting entity is based on a subscription established for the requesting entity to at least some presence information of the responding entity.

11. The method of claim 1, wherein the response is sent to the requesting entity using an identifier of the requesting entity included in presence information of the responding entity.

12. The method of claim 1, wherein the response is sent to the requesting entity in response to a fetching or a polling request by the requesting entity for at least some presence information of the responding entity.

13. The method of claim 1, wherein the request is included in presence information associated with the requesting entity but is not included in presence information associated with the responding entity and the response is included in the presence information associated with the responding entity but is not included in the presence information associated with the requesting entity.

14. The method of claim 13, wherein the presence information associated with the responding entity corresponds to presence information of the resource or presence information of an owner of the resource.

15. The method of claim 14, wherein when the presence information associated with the responding entity corresponds to presence information of the resource, the presence information of the resource includes a link to the presence information of the owner of the resource.

16. The method of claim 13, wherein the presence information associated with the requesting entity corresponds to presence information of a second resource associated with the requesting entity or presence information of an owner of the second resource, the second resource being configured to form the request.

17. The method of claim 1, comprising:
authenticating an identity of each of the requesting and responding entities; and
authorizing a receiving by each of the entities of the request or the response prior to sending the request or response to the respective entity.

18. The method of claim 1, comprising:
providing a proxy service configured for sending the request to the responding entity through a firewall associated with the responding entity or for sending the response to the requesting entity through a firewall associated with the requesting entity.

19. The method of claim 1, wherein the resource is at least one of a service, an application program, a file, and data associated with the responding entity.

20. The method of claim 1, wherein the descriptor is included in the request.

21. The method of claim 1, wherein the descriptor is included in each of respective presence protocol commands used in receiving the request from the requesting entity and in sending the request to the responding entity.

22. The method of claim 1, comprising using the presence protocol for receiving from the responding entity a second descriptor of a second resource associated with a second responding entity and a second request related to the second resource, and for sending the second descriptor and the second request to the second responding entity, wherein the second request is related to the response replying to the request from the requesting entity.

23. A method for providing a general request/response protocol using a presence protocol, the method comprising:
using a presence protocol for receiving from a requesting entity a descriptor of a resource associated with a responding entity and a request related to the resource;
using the descriptor to update the presence information of the responding entity to include the request;
receiving the presence information from the responding entity, the presence information including a response replying to the request; and
sending the response to the requesting entity using the presence protocol.

24. A method for providing a general request/response protocol, the method comprising:
using a presence protocol for receiving via a presence server a descriptor of a resource and a request related to the resource;
processing the request by the resource to form a response replying to the request; and
sending the response to the presence server using the presence protocol.

25. The method of claim 24, comprising using the presence protocol for sending the descriptor of the resource to the presence server.

26. A method for providing a general request/response protocol, the method comprising:
using a presence protocol for:
sending a descriptor of a resource and a request related to the resource to a presence server; and
receiving via the presence server a response replying to the request.

27. The method of claim 26, comprising using the presence protocol for receiving the descriptor of the resource from the presence server.

28. A system for providing a general request/response protocol, the system comprising:
a presence server configured to receive, store, and distribute information using a presence protocol;
a responding device configured to exchange information with the presence server using the presence protocol, the responding device including:

access to at least one resource;

a responding watcher component configured to receive via the presence server a descriptor of the resource and a request related to the resource; and a responding presentity component configured to send a response to the presence server replying to the request; and a requesting device configured to exchange information with the presence server using the presence protocol, the requesting device including:

a requesting presentity component configured to send the descriptor and the request related to the resource to the presence server; and a requesting watcher component configured to receive via the presence server the response replying to the request.

29. The system of claim 28, wherein the responding presentity component is further configured to send the descriptor of the resource to the presence server, and the requesting watcher component is further configured to receive the descriptor of the resource from the presence server.

30. The system of claim 29, wherein the responding device includes a responding user agent component coupled to the resource and the responding presentity and watcher components, the responding user agent component configured to facilitate a sending of the descriptor of the resource by the responding presentity component, a processing by the resource of the request received by the responding watcher component, and a sending of the response by the responding presentity component.

31. The system of claim 29, wherein the requesting device includes a requesting user agent component coupled to the requesting presentity and watcher components, the requesting user agent configured to facilitate a presentation of the descriptor received by the requesting watcher component, a sending of the request by the requesting presentity component, and a presentation of the response received by the requesting watcher component.

32. The system of claim 28, wherein the presence server includes a proxy service configured to send the request to the responding watcher component through a firewall associated with the responding device or to send the response to the requesting watcher component through a firewall associated with the requesting device.

33. The system of claim 28, wherein the presence server includes an account service configured to authenticate an identity of each of the requesting and responding devices and to authorize a receiving by each of the devices of the request or response prior to sending the request or response to the respective device.

34. The system of claim 33, comprising a database coupled to the account service including roster and/or privacy list information used by the account service to authorize the receiving by each of the devices of the request or response.

* * * * *